(12) United States Patent
Lee et al.

(10) Patent No.: US 12,546,470 B2
(45) Date of Patent: Feb. 10, 2026

(54) SCRUBBER BURNER

(71) Applicant: CSK INC., Yongin-si (KR)

(72) Inventors: Pil-Hyong Lee, Yongin-si (KR);
YoungWoong Lee, Yongin-si (KR);
MyungKeun Noh, Yongin-si (KR);
Hyeon Yun Cho, Yongin-si (KR)

(73) Assignee: CSK Inc., Yongin-si (KR)

( * ) Notice: Subject to any disclaimer, the term of this patent is extended or adjusted under 35 U.S.C. 154(b) by 508 days.

(21) Appl. No.: 18/000,475

(22) PCT Filed: May 24, 2021

(86) PCT No.: PCT/IB2021/054485
§ 371 (c)(1),
(2) Date: Dec. 1, 2022

(87) PCT Pub. No.: WO2021/245496
PCT Pub. Date: Dec. 9, 2021

(65) Prior Publication Data
US 2023/0220994 A1 Jul. 13, 2023

(30) Foreign Application Priority Data
Jun. 2, 2020 (KR) .................. 10-2020-0066180

(51) Int. Cl.
F23G 7/06 (2006.01)
F23D 14/32 (2006.01)
F23D 14/66 (2006.01)

(52) U.S. Cl.
CPC ............. *F23G 7/066* (2013.01); *F23D 14/32* (2013.01); *F23D 14/66* (2013.01); *F23G 2209/142* (2013.01)

(58) Field of Classification Search
None
See application file for complete search history.

(56) References Cited

U.S. PATENT DOCUMENTS 3,192,920 A * 7/1965 See .................. F23C 3/004
431/90
5,510,093 A * 4/1996 Bartz .................. F23D 14/16
423/245.3
(Continued)

FOREIGN PATENT DOCUMENTS

CN 110242972 A 9/2019
EP 0694735 A1 * 1/1996 ............. F23D 14/16
(Continued)

OTHER PUBLICATIONS

British Search Report dated Apr. 25, 2021 for corresponding British application Serial No. GB2017882.8, 1 page.
(Continued)

*Primary Examiner* — Jorge A Pereiro
(74) *Attorney, Agent, or Firm* — Theodore M. Magee; Westman, Champlin & Koehler, P.A.

(57) ABSTRACT

The present invention presents a scrubber burner composed of a preheating spray ring that is formed with a porous material with certain thickness, and that preheats and sprays the fuel gas in the preheating combustion space formed inside, a preheating guide ring equipped with multiple preheating guide holes that wrap the outer circumference of the aforementioned preheating spray ring, and that penetrates from the outer circumference to the inner circumference, and a preheating burner module equipped with a housing that forms a ring shaped gas channel that is separated from the outer circumference of the aforementioned preheating guide ring and through which the aforementioned fuel gas flows.

7 Claims, 11 Drawing Sheets

(56) References Cited

U.S. PATENT DOCUMENTS

| | | | | |
|---|---|---|---|---|
| 5,743,723 | A | * | 4/1998 | Latrides ............... F23D 1/00 431/12 |
| 5,957,678 | A | * | 9/1999 | Endoh ............... F23G 7/065 431/243 |
| 6,153,150 | A | * | 11/2000 | Moore ............... F23J 15/04 422/111 |
| 6,196,834 | B1 | * | 3/2001 | Berger ............... F23D 14/32 431/187 |
| 6,261,524 | B1 | * | 7/2001 | Herman ............... F23J 15/022 422/174 |
| 6,423,284 | B1 | * | 7/2002 | Arno ............... B01D 53/68 423/240 R |
| 6,685,461 | B2 | * | 2/2004 | Rio ............... C03B 5/2353 431/12 |
| 6,736,635 | B1 | * | 5/2004 | Takemura ............... F23L 7/007 431/185 |
| 7,270,539 | B1 | | 9/2007 | Sujata |
| 7,700,049 | B2 | * | 4/2010 | Clark ............... F23G 7/065 422/171 |
| 7,758,818 | B2 | * | 7/2010 | Lee ............... C23C 16/4412 422/168 |
| 7,790,120 | B2 | * | 9/2010 | Moore ............... F23J 15/04 423/210 |
| 8,696,348 | B2 | * | 4/2014 | Cao ............... F23D 14/32 431/353 |
| 10,627,107 | B2 | * | 4/2020 | Hirata ............... F23D 14/22 |
| 10,690,341 | B2 | * | 6/2020 | Silberstein ............... F23G 5/12 |
| 2001/0032543 | A1 | * | 10/2001 | Seeley ............... B01D 53/70 95/227 |
| 2003/0143445 | A1 | * | 7/2003 | Daniel ............... F02M 27/02 60/275 |
| 2004/0216378 | A1 | * | 11/2004 | Smaling ............... H01M 8/0631 48/197 R |
| 2006/0104879 | A1 | * | 5/2006 | Chiu ............... F23G 7/065 422/171 |
| 2014/0308186 | A1 | * | 10/2014 | Messineo ............... B01D 53/38 423/210 |
| 2014/0308187 | A1 | * | 10/2014 | Messineo ............... B01D 53/75 423/210 |
| 2015/0184850 | A1 | * | 7/2015 | Seeley ............... F23D 14/145 431/328 |
| 2020/0033000 | A1 | * | 1/2020 | Yanagisawa ............... B01D 53/76 |
| 2020/0116353 | A1 | * | 4/2020 | Faler ............... F23G 5/12 |

FOREIGN PATENT DOCUMENTS

| | | | | | |
|---|---|---|---|---|---|
| EP | 2719949 | A1 | | 4/2014 | |
| GB | 2532776 | A | | 11/2014 | |
| JP | 2001082723 | A | | 3/2001 | |
| JP | 2001349521 | A | | 12/2001 | |
| JP | 2002061821 | A | | 2/2002 | |
| JP | 2003056830 | A | | 2/2003 | |
| JP | 2008541002 | A | | 5/2012 | |
| JP | 2016085006 | A | | 5/2016 | |
| JP | 2016522379 | A | | 7/2016 | |
| JP | 2019074217 | A | | 5/2019 | |
| KR | 20060061635 | A | | 6/2006 | |
| KR | 20140052279 | A | | 5/2014 | |
| KR | 20160094495 | A | * | 8/2016 | ............ F23D 14/68 |
| TW | 542886 | B | | 7/2003 | |
| WO | 2008122819 | A1 | | 10/2008 | |
| WO | WO-2011010957 | A1 | * | 1/2011 | ............ C01B 3/38 |
| WO | 2017037419 | A1 | | 3/2017 | |

OTHER PUBLICATIONS

International Search Report dated Sep. 1, 2021 for corresponding PCT application Serial No. PCT/IB2021/054485, 4 pages.

International Written Opinion dated Sep. 1, 2021 for corresponding PCT application Serial No. PCT/IB2021/054485, 6 pages.

Japanese Notification of Reason for Rejection dated Mar. 17, 2025 for corresponding Japanese application Serial No. 2022/574136, 12 pages.

Taiwanese Office Action dated Dec. 19, 2024 (no translation) and Search Report dated Dec. 16, 2024 for corresponding Taiwanese application Serial No. 110120022, 14 pages.

* cited by examiner

SCRUBBER BURNER

CROSS-REFERENCE OF RELATED APPLICATION

This application is a Section 371 National Stage Application of International Application No. PCT/IB2021/054485, filed May 24, 2021, and published as WO 2021/245496 A1 on Dec. 9, 2021, the content of which is hereby incorporated by reference in its entirety and which claims priority of Korean Application No. 10-2020-0066180, filed Jun. 2, 2020.

FIELD

The present invention pertains to a scrubber burner used with heating-type scrubbers that are used for treating emission gas produced during the electronic industry process.

BACKGROUND

Emission gas produced in the electronic industry processes such as the semiconductor production process, LCD production process, and OLED production process is composed of VOC, PFC gas, water, and other materials. Especially, the PFC gas is one of the gas components produced during the semiconductor etching process and chemical deposition process, and is known to facilitate global warming. Additionally, PFC gas is a very stable gas chemically, and is known not to decompose when during treatment. PFC gas contained in the emission gas is treated by scrubbers using the heating method, adhesion method, or plasma method.

The aforementioned heating method is the most general method to treat PFC gas. With the conventional heating method, emission gas is heated and decomposed at 1,300° C. or higher using oxygen as oxidizer, so nitrogen and oxygen contained in the emission gas react and produce large amount of nitrogen oxide, which is a harmful material. Furthermore, it is becoming necessary to reduce nitrogen oxide due to the strengthening of emission standards for nitrogen oxide contained in emission gas.

The discussion above is merely provided for general background information and is not intended to be used as an aid in determining the scope of the claimed subject matter. The claimed subject matter is not limited to implementations that solve any or all disadvantages noted in the background.

SUMMARY

The present invention provides a scrubber burner that improves flame stability and efficiency in emission gas treatment.

In order to achieve the aforementioned purpose, the scrubber burner under the present invention is composed of a porous material with certain thickness, and includes a preheating spray ring that preheats fuel gas in the preheating combustion space formed inside and sprays the fuel gas, a preheating guide ring equipped with multiple guide holes that penetrate from the outer circumference to the inner circumference, and a preheating burner module that is separated from the outer circumference of the aforementioned preheating guide ring to form a gas channel in the shape of a ring through which the aforementioned fuel gas flows. At this time, the inner circumference of the aforementioned preheating guide ring can come into contact with the outer circumference of the aforementioned preheating spray ring.

Additionally, the aforementioned preheating spray ring is formed with a porous structure, and could be formed with a perforated plate, metal fibers, metal foams, packed beads, ceramic foams, nano-sized porous media, or porous sintered metals.

Additionally, the aforementioned preheating burner module is formed with at least two layers, and the aforementioned preheating burner modules can spray fuel gases with different components or fuel gases with different mixing ratios.

Additionally, the aforementioned scrubber burner is located at the upper part or lower part of the aforementioned preheating burner module, and multiple spray holes that penetrate from the outer circumference to the inner circumference are formed, and could further include a mixing spray ring that sprays mixed fuel gas to the mixing combustion space formed inside, a mixing guiding ring equipped with multiple mixing guide holes that penetrate from the outer circumference to the inner circumference, and a mixing burner module that is separated from the outer circumference of the aforementioned mixing guide ring and that is equipped with a mixing housing that forms a mixed gas channel in the shape of a ring through which the aforementioned mixed fuel gas flows. Here, the aforementioned mixed combustion space could be connected with the aforementioned preheating combustion space.

Additionally, the aforementioned mixed burner module could be formed with at least two layers.

Additionally, the scrubber burner is located at the lower part of the aforementioned preheating burner module or at the lower part of the mixed burner module, and a lower spray module equipped with a lower spray ring that sprays lower fuel gas to the lower combustion space connected to the aforementioned preheating combustion space or mixed combustion space could further be included.

Additionally, the aforementioned lower spray module further includes a lower housing that wraps the outer circumference of the aforementioned lower combustion space, on which a ring-shaped lower gas channel through which the aforementioned lower fuel gas flows is formed, and is equipped with a lower outer hole that penetrates from the outer circumference to the aforementioned lower gas channel, and the aforementioned lower spray ring is located at the inner side of the aforementioned lower gas channel, and could include a lower spray hole that sprays the aforementioned lower fuel gas.

Additionally, the aforementioned lower spray module is equipped with a lower separation panel that separates the first lower gas channel and the second lower gas channel, and the aforementioned lower outer wall hole and the aforementioned lower spray hole could be respectively connected to the aforementioned first lower gas channel and the second lower gas channel.

Additionally, the scrubber burner could further include a burner that preheats the mixed gas with fuel reach conditions and then reforms the gas to mixed gas with hydrogen reach conditions to spray to the aforementioned preheating combustion space.

Additionally, the aforementioned burner is formed with a housing in the shape of a tube with the upper part and the lower part opened, and with a porous material, and is formed with a preheating layer that is located at the upper part of the inner side of the aforementioned housing to preheat the aforementioned mixed gas with the fuel reach conditions and a porous material, and could include a reforming layer that reforms the aforementioned mixed gas with fuel reach conditions to the aforementioned mixed gas with hydrogen reach conditions.

Additionally, the scrubber burner in accordance with an embodiment of the present invention includes the main burner module that sprays the main fuel gas to the main combustion space formed inside, the upper head module that is located at the upper part of the aforementioned main burner module, to supply waste gas to the aforementioned main combustion space, and that includes a burner containing groove that is opened at the bottom and the upper head equipped with the upper fuel supply channel that supplies the upper fuel gas to the aforementioned burner containing groove, and the upper burner module that closes the aforementioned burner containing groove's lower part to form the upper gas channel at the upper part and that is equipped with an upper spray panel that supplies the upper fuel as to the aforementioned main combustion space.

Additionally, the aforementioned upper spray panel is composed of a porous material with certain thickness, and could have multiple holes that penetrate from the upper side to the lower side.

Additionally, the aforementioned upper head is equipped with a reverse expansion containing head channel that penetrates from the outer upper side to the lower side, and could further include a reverse expansion burner that penetrates the aforementioned reverse expansion containing head channel and is exposed to the lower side of the aforementioned upper head.

Additionally, the aforementioned upper spray panel is equipped with a reverse expansion containing spray channel that penetrates from the upper side to the lower side, and the aforementioned reverse expansion burner could penetrate the aforementioned reverse expansion containing spray channel and be exposed below the lower side of the aforementioned upper head.

Additionally, the aforementioned reverse expansion burner could include the first nozzle equipped with the first main body in the shape of a tube, the second nozzle equipped with the second main body that is positioned to wrap the outer circumference of the aforementioned first main body, and the third nozzle equipped with the third main body that is positioned to wrap the outer circumference of the aforementioned second main body.

Additionally, the aforementioned first nozzle could spray an oxidizer, the aforementioned second nozzle could spray fuel or mixed gas with fuel and an oxidizer mixed, and the aforementioned third nozzle could spray a mixed gas with an oxidizer or mixed gas with fuel and an oxidizer mixed.

Additionally, the aforementioned scrubber burner could further include the first separation component that is positioned between the aforementioned main body and the second main body to maintain the separation space between the aforementioned first main body and the second main body and the second separation component that is positioned between the aforementioned second main body and the third main body to maintain the separation distance between the aforementioned second main body and the third main body.

The scrubber burner under the present invention is composed of a mixed burner module and a preheating burner module that have different structures layered vertically to increase flame stability and emission gas treatment efficiency.

Additionally, with the scrubber burner under the present invention the type and amount of oxidizer supplied to the mixed burner module and the type and amount of oxidizer supplied to the preheating burner module as well as the amount of fuel supplied to each module are adjusted differently to increase efficiency in treating emission gas.

Additionally, with the scrubber burner under the present invention, at least two preheating burner modules equipped with porous spray rings are layered depending on the composition and amount of the emission gas flowing into the semiconductor process to increase treatment efficiency of emission gas.

Additionally, with the scrubber burner under the present invention, at least two preheating burner modules equipped with porous spray rings are layered depending on the composition and amount of the emission gas flowing into the semiconductor process, and the height is formed differently to increase emission gas treatment efficiency.

Additionally, with the scrubber burner under the present invention, at least two preheating modules equipped with porous spray rings are layered, and fuel and the oxidizer are independently supplied in order to provide different equivalence ratios to increase emission gas treatment efficiency.

Additionally, the scrubber burner under the present invention is mixed in advanced and then sprayed to combustion areas, so extent of mixing of fuel and oxidizer is high, thereby stabilizing flame formation.

Additionally, the scrubber burner under the present invention is equipped with a lower fuel spray module where fuel is additionally sprayed or lower oxidizer spray module where the oxidizer is additionally sprayed, so that is possible to effectively eliminate pollutants such as nitrogen oxide and carbon monoxide.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

DETAILED DESCRIPTION

Below, the scrubber burner in accordance with an embodiment of the present invention will be described by referring to the attached drawings.

First, the structure of the scrubber burner in accordance with an embodiment of the present invention will be described.

Figure 1:
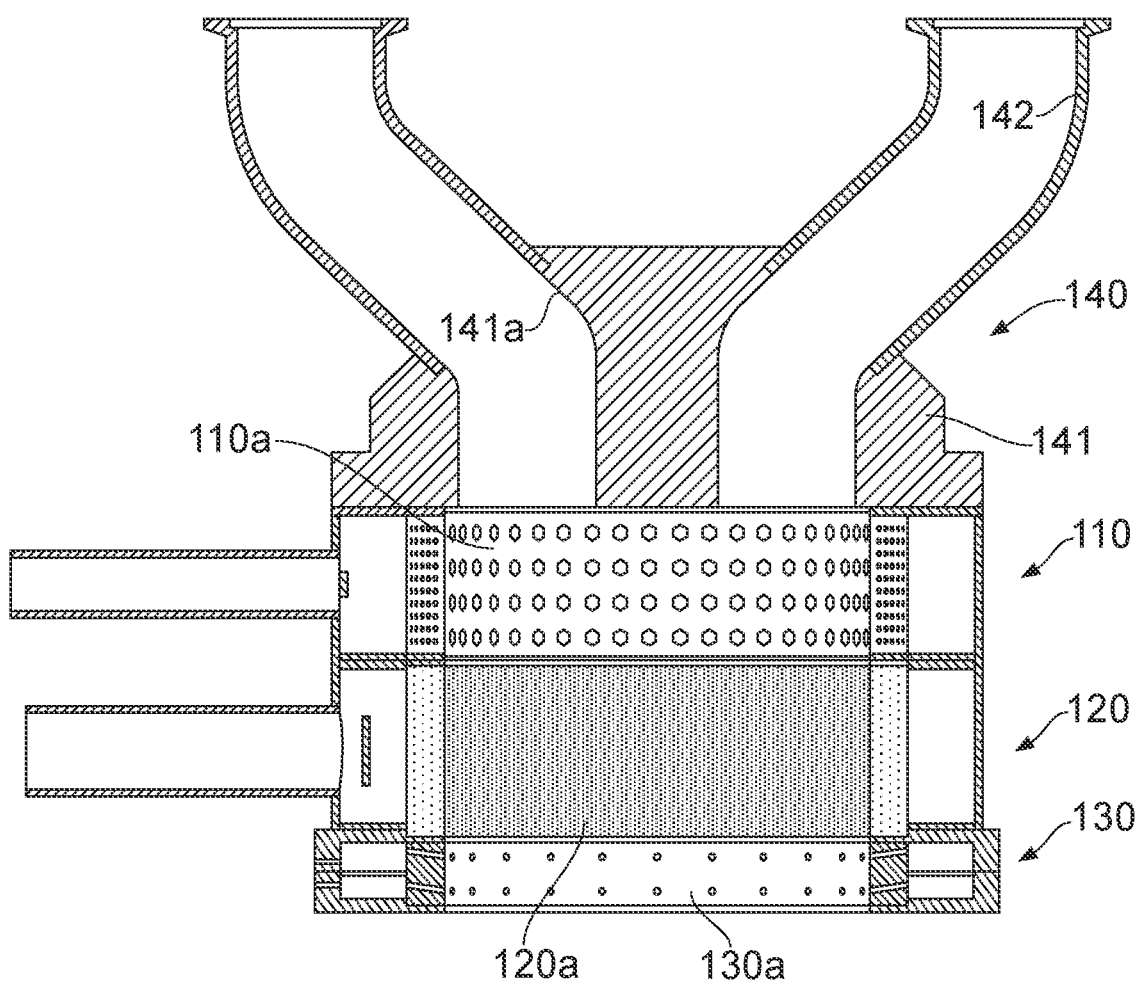
FIG. 1 is a horizontal cross-sectional diagram of the scrubber burner in accordance with an embodiment of the present invention.
Figure 2:
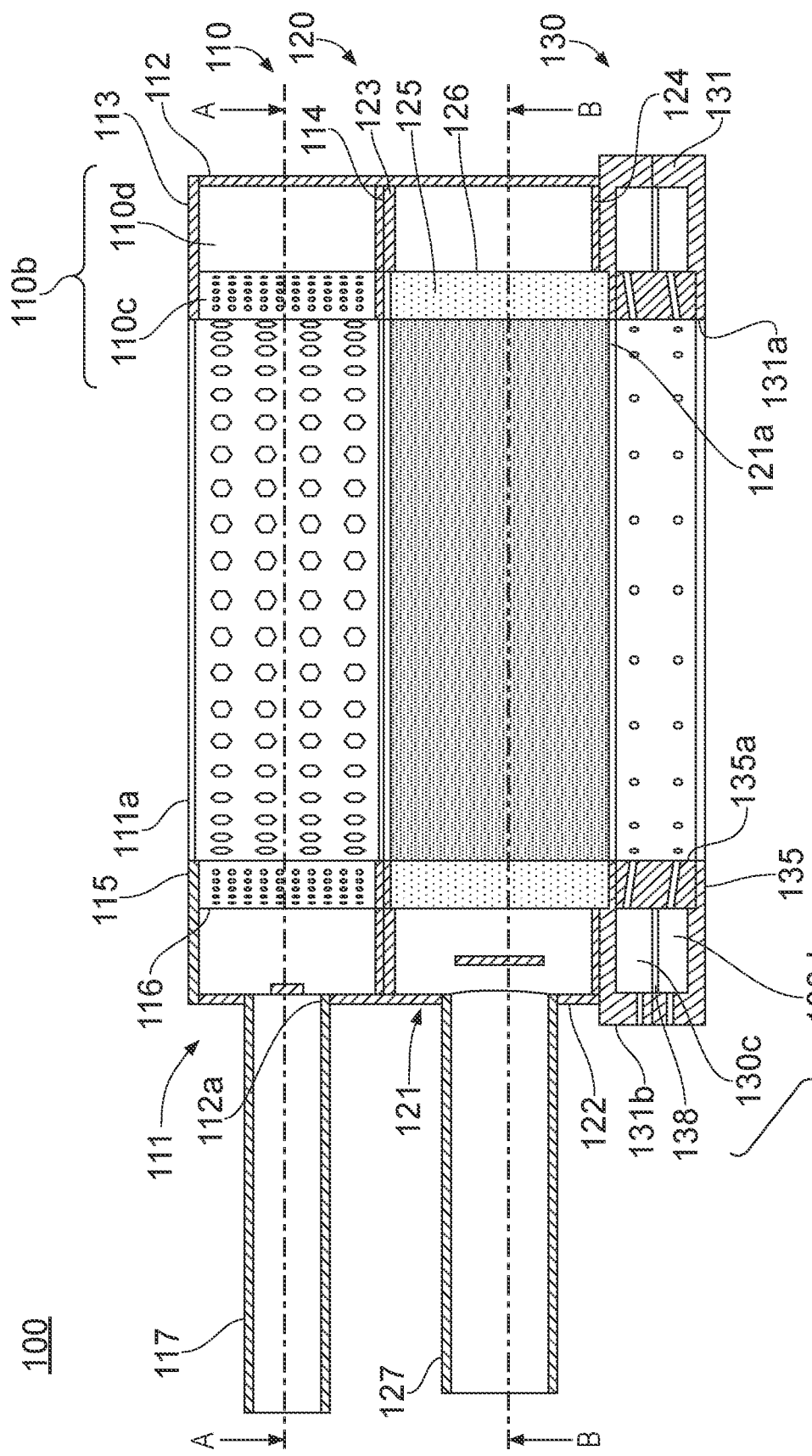
FIG. 2 is a vertical cross-sectional diagram of the area in the scrubber burner in FIG. 1 where the mixed burner module, preheating burner module, and lower spray module are included.
Figure 3:
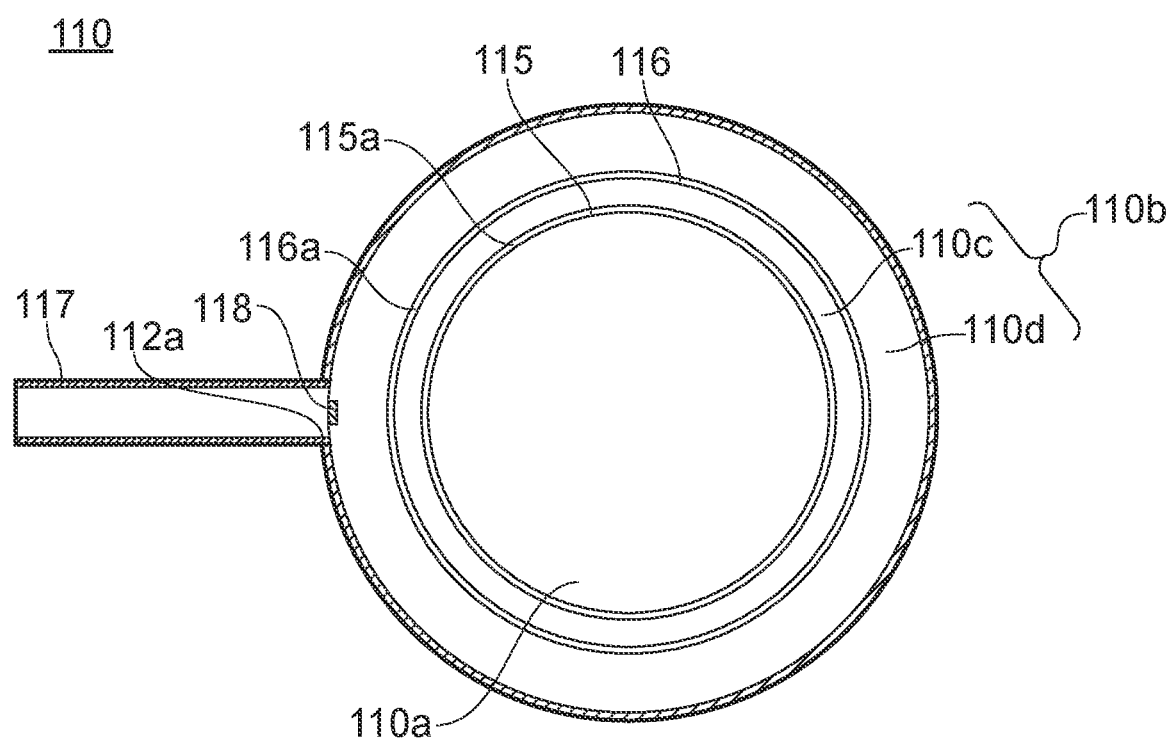
FIG. 3 is a horizontal cross-sectional diagram of A-A of the scrubber burner illustrated in FIG. 1.
Figure 4:
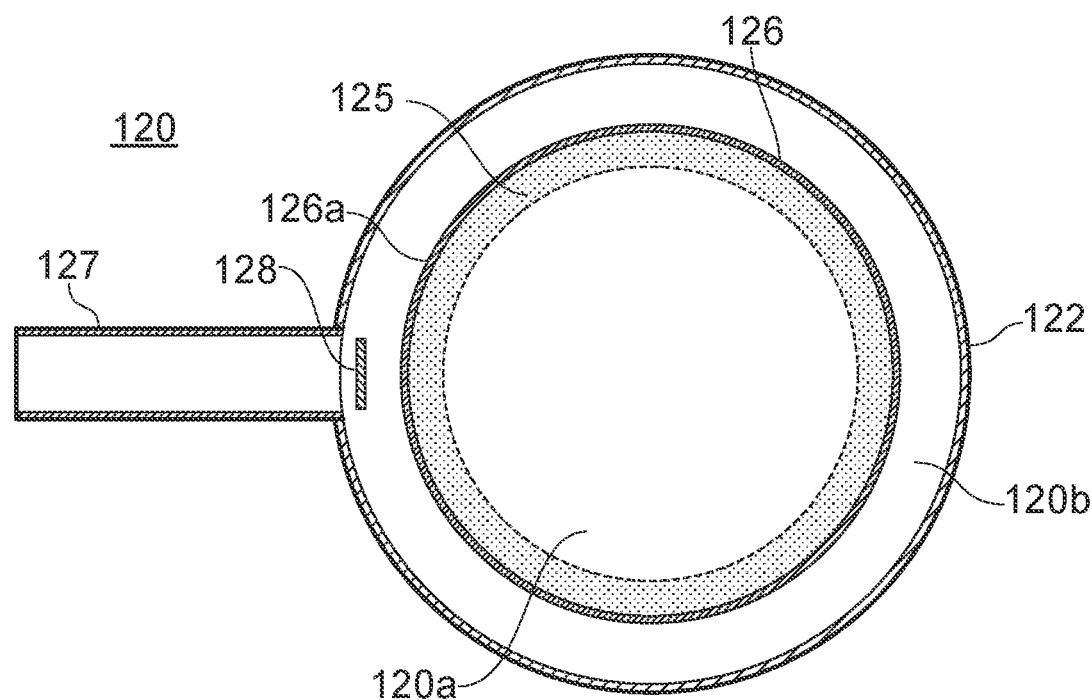
FIG. 4 is a horizontal cross-sectional diagram of B-B of the scrubber burner illustrated in FIG. 1.
Figure 5:
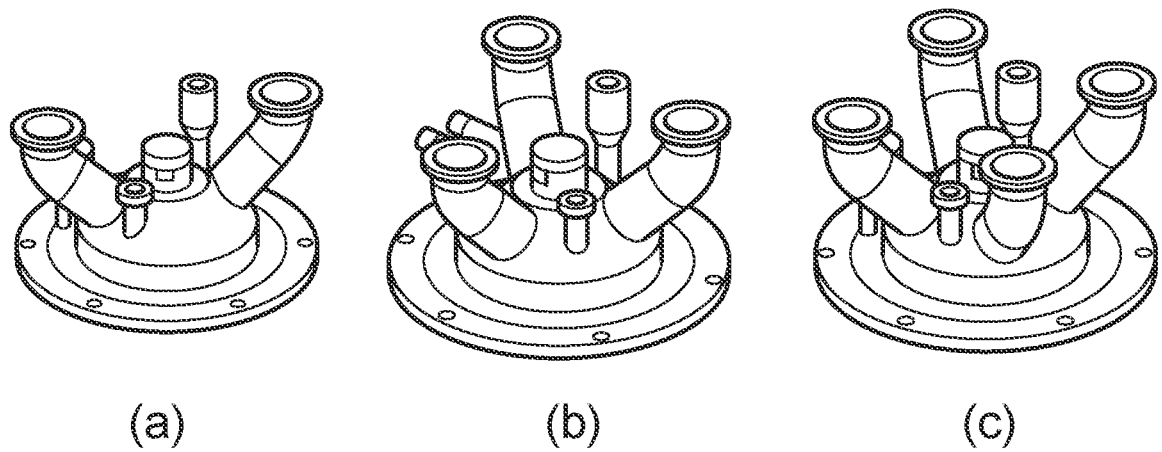
FIG. 5 is a perspective diagram that illustrates the state in which the upper housing of diverse structure used with the scrubber burner in accordance with an embodiment of the present invention has been integrated.

FIG. 1 is a horizontal cross-sectional diagram of the scrubber burner in accordance with an embodiment of the present invention. FIG. 2 is a horizontal cross-sectional diagram of the areas that include the mixed burner module, preheating burner module, and lower spray module in the scrubber burner of FIG. 1. FIG. 3 is a horizontal cross-sectional diagram of A-A of the scrubber burner illustrated in FIG. 1. FIG. 5 is a perspective diagram that illustrates the state in which the upper housing of various structures used with the scrubber burner in accordance with an embodiment of the present invention.

When we refer to FIG. 1 to FIG. 5, we can see that the scrubber burner (100) in accordance with an embodiment of the present invention could include a mixed burner module (110) and a preheating burner module (120). Additionally, the aforementioned scrubber burner (100) could further include a lower spray module (130). Additionally, the aforementioned scrubber burner (100) could further include an upper head module (140).

The aforementioned scrubber burner (100) could be formed by selectively including a mixed burner module (110) and a preheating burner module (120) depending on the composition and amount of the emission gas produced during the semiconductor production process or panel display device production process. For example, the aforementioned scrubber burner (100) could be formed by including the preheating burner module (120), instead of including the mixed burner module (110). At this time, the aforementioned scrubber burner (100) could include at least two preheating burner modules (120) that are layered vertically. Additionally, the aforementioned scrubber burner (100) could be formed by layering multiple numbers of each of the mixed burner module (110) and preheating burner module (120). For example, the aforementioned scrubber burner (100) could be formed by sequentially layering at least one of the mixed burner module (110) and at least one of the preheating burner module (120) from the top to the bottom. Additionally, the aforementioned scrubber burner (100) could be formed by consequentially layering at least one of the preheating burner module (120) and at least one of the mixed burner module (110) from the top to the bottom. Additionally, the aforementioned scrubber burner (100) could be formed by consequentially layering from the top the preheating burner module (120), mixed burner module (110), and preheating burner module (120). Below, the focus of description of the aforementioned scrubber burner (100) will be on the vertical layer structure of the mixed burner module (110) and preheating burner module (120).

Additionally, with the aforementioned scrubber burner (100), it is possible for the height of the mixed burner module (110) and the height of the preheating burner module (120) to be set differently depending on the composition and amount of the emission gas flowing into the semiconductor production process or flat panel display device production process. Additionally, with the aforementioned scrubber burner (100), height of the preheating burner module (120) could be set higher than height of the mixed burner module (110).

With the aforementioned scrubber burner (100), emission gas could flow in from the upper part of the mixed burner module (110) to the inner side. Therefore, with the aforementioned scrubber burner (100), emission gas is combusted by flowing consequently from the upper part to the lower part, flowing from the mixed burner module (110) to the preheating burner module (120).

Additionally, depending on the composition and amount of emission gas flowing in during the flat panel display device production process or semiconductor production process, the type and amount of oxidizer supplied to the mixed burner module (110) and preheating burner module (120) or the amount of fuel could be adjusted differently. For example, since the aforementioned mixed burner module (110) is supplied with mixed fuel gas containing an oxidizer that includes air and oxygen and fuel, and since the mixed fuel gas is sprayed through a relatively large spray hole, it is possible to combust emission gas (semiconductor waste gas) by stably forming relatively high-temperature flame. Additionally, the aforementioned preheating burner module (120) could be supplied with preheating fuel gas that contains an oxidizer that includes relatively small air and fuel, could mix preheating fuel gas through a porous spray ring with certain length to combust, and could combust emission gas (semiconductor waste gas) through surface combustion by stably forming flames by preheating mixed gas through the porous spray ring.

Additionally, with the aforementioned scrubber burner (100), if at least two preheating burner modules (120) are layered, it is possible to improve emission gas treatment efficiency by supplying preheating fuel gases with fuel and the oxidizer mixed in different ratios in order for each of the preheating burner module (120) to have a different equivalence ratio.

Fuel supplied to the aforementioned scrubber burner (100) could be any one selected from all carbon hydrogen fuels ($C_nH_m$) including hydrogen ($H_2$), methane ($CH_4$), propane ($C_3H_3$), natural gas ($CH_4+C_3H_8$) or any mixture of these.

Additionally, the oxidizer used with the aforementioned scrubber burner (100) could be any one selected from oxygen, compressed dry air (CDA), air, mixed gas containing oxygen and air, mixed gas containing oxygen and CDA, mixed gas containing oxygen and nitrogen, mixed gas containing CDA and nitrogen, mixed gas containing air and nitrogen, and mixed gas containing oxygen, air, and nitrogen, or a mixture of these.

The aforementioned mixed fuel gas and preheating gas are mixed in certain ratio at the outside of the scrubber burner (100) and supplied to the mixed burner module (110) and the preheating burner module (120). Therefore, since the aforementioned mixed fuel gas and preheating fuel gas are supplied to the mixed burner module (110) and the preheating burner module (120) after fuel and the oxidizer are uniformly mixed, extent of incomplete combustion is reduced, and it is possible to reduce the amount of emission gas produced.

The aforementioned mixed burner module is formed by including a mixed housing (111), a mixed spray ring (115), a mixed guide ring (116), and a mixed supply pipe (117).

The aforementioned mixed burner module (110) is positioned at the upper part of the scrubber burner (100). The aforementioned mixed burner module (110) is equipped with a mixed combustion space (110a) to which emission gas flows and a mixed gas channel (110b) to which mixed fuel gas is supplied. The aforementioned mixed combustion space (110a) is formed inside the mixed spray ring (115) that is located at the inner side of the mixed housing (111). The aforementioned mixed gas channel (110b) is formed between the inside of the mixed housing (111) and the outer circumference of the mixed spray ring (115). The aforementioned mixed gas channel (110b) is connected with the mixed supply pipe (117). The aforementioned mixed fuel gas is sprayed through the mixed spray ring (115) and forms flames in the mixed combustion space (110a) along the inner circumference of the mixed spray ring (115). The aforementioned mixed burner module (110) combusts the emission gas flowing into the mixed combustion space (110a) by using flames. The aforementioned mixed burner module (110) supplies combusted emission gas to the preheating burner module (120).

The aforementioned mixed housing (111) is formed inside with a mixed gas channel (110b) in the shape of a ring to which mixed fuel gas flows, and the inner side is opened toward the mixed combustion space (110a). The aforementioned mixed gas channel (110b) could be located at the outer side of the mixed combustion space (110a). The aforementioned mixed gas channel (110b) could be formed in such a way that the inner circumference wraps the outer circumference of the mixed combustion space (110a). Additionally, the aforementioned mixed housing (111) is formed in the shape of a ring wherein the inner side is equipped with a mixed housing hole (111a) that penetrates from the upper part to the lower part. The aforementioned mixed housing hole (111a) opens the mixed combustion space (110a) vertically. The aforementioned mixed gas channel (110b) is connected to the mixed combustion space (110a), and the mixed gas that flows in is sprayed to the mixed combustion space (110a). The aforementioned mixed housing (111) is formed by including a mixed outer wall ring (112), a mixed upper panel ring (113), and a mixed lower panel ring (114). The aforementioned outer wall ring, mixed upper panel ring (113), and mixed lower panel (114) ring could be formed in a single body. The aforementioned mixed housing (111) could be formed in such a way that the inner side that faces the mixed outer wall ring (112) forms the shape of "⊏." The aforementioned mixed housing (111) provides a mixed as channel (110b) through which the mixed fuel gas that is supplied through the mixed supply pipe (117) flows. The mixed fuel gas that flows into the inside of the aforementioned mixed housing (111) flows along the mixed gas channel (110b) and passes through the mixed guide ring (116) to spray to the mixed fuel gas through the mixed spray ring (115).

The aforementioned mixed outer wall ring (112) is formed in the shape of a circular ring with certain diameter and height. The aforementioned mixed upper panel ring (113)'s outer diameter corresponds to the diameter of the mixed outer wall ring (112), and the inner diameter corresponds to the diameter of the mixed housing hole (111a). The aforementioned mixed upper panel ring (113) combines with the upper part of the mixed outer wall ring (112). The aforementioned mixed lower panel ring (114) is formed in a shape that corresponds to the mixed upper panel ring (113), and combines with the lower part of the mixed outer wall ring (112). The aforementioned mixed outer wall ring (112) could be equipped with a mixed outer wall hole (112a). The aforementioned mixed outer wall hole (112a) is formed by penetrating from the outer circumference to the inner circumference, and the mixed supply pipe (117) is combined.

The aforementioned mixed spray ring (115) is formed in the shape of a ring with certain thickness and height. The aforementioned mixed spray ring (115) is formed to have a diameter that corresponds to the mixed housing hole (111a), and is combined with the mixed housing hole (111a) of the mixed housing (111). Additionally, the aforementioned mixed spray ring (115) is combined by being supported between the mixed upper panel ring (113) and mixed lower panel ring (114) of the mixed housing (111). The aforementioned mixed spray ring (115) separates the mixed gas channel (110b) and the mixed combustion space (110a) spatially.

The aforementioned mixed spray ring (115) is formed by being equipped with multiple mixed spray holes (115a) that penetrate from the outer circumference to the inner circumference. The aforementioned mixed spray hole (115a) works as spray nozzle that spray mixed fuel gas. The aforementioned mixed spray holes (115a) are formed in such a way as to be distributed entirely over the mixed spray ring (115). Many of the aforementioned mixed spray holes (115a) form a single spray nozzle, and it is possible for single spray nozzles to be positioned separated from each other. For example, the aforementioned single spray nozzle could be positioned at the center of a single mixed spray hole (115a), and multiple mixed spray holes (115a) could be positioned radially to form a flower shape overall. If the aforementioned mixed spray hole (115a) is formed in such a way as to form a single spray nozzle, mixed fuel gas is sprayed on a single point, so that flames are formed in consistent size and are maintained stably, so that combustion of emission gas can proceed efficiently.

The aforementioned mixed guide ring (116) is formed in the shape of a ring corresponding to the mixed spray ring (115), and the diameter is larger than that of the mixed spray ring (115). The aforementioned mixed guide ring (116) is located between the mixed outer wall ring (112) and mixed spray ring (115) of the mixed housing (111). The aforementioned mixed guide ring (116) is combined by being supported between the mixed upper panel ring (113) and mixed lower panel ring (114) of the mixed housing (111). Therefore, the aforementioned mixed guide ring (116) could separate the mixed fuel space (110b) into the mixed inner side gas channel (110c) and the mixed outer gas channel (110d). The aforementioned mixed guide ring (116) passes through the mixed fuel gas supplied to the mixed outer side gas channel (110d) in order to flow into the mixed inner side gas channel (110c). Therefore, the aforementioned mixed fuel gas is mixed by flowing to the mixed outer side gas channel (110d), and can be mixed again by passing through the mixed guide ring (116) and flowing in the mixed inner gas channel. Therefore, the aforementioned mixed fuel gas could be more efficiently mixed because it is mixed in two stages.

The aforementioned mixed guide ring (116) is formed by being equipped with multiple mixed guide holes (116a) that penetrate from the outer circumference to the inner circumference. The aforementioned mixed guide hole (116a) is formed in such a way as to be distributed over the entire mixed guide ring (116). The aforementioned mixed guide hole (116a) is formed with a larger area than the mixed spray hole (115a). The mixed fuel gas supplied to the aforementioned mixed guide hole (116a) flows along the mixed outer side gas channel (110d) and passes through the mixed guide ring (116a) to be supplied to the mixed inner side gas channel (110c).

The aforementioned mixed guide hole (116a) is formed in such a way that the entire area is larger than the entire area of the mixed spray hole (115a). The aforementioned mixed guide hole (116a) minimizes reduction of supply pressure of the mixed fuel gas at the mixed inner side gas channel that is separated by the mixed guide ring (116a) in order to ensure that the mixed fuel gas at the mixed spray hole (115a) is sprayed smoothly. If the entire area of the aforementioned mixed guide hole (116a) is less than the entire area of the mixed spray hole (115a), pressure at the mixed outer side gas channel (110d) increases, and pressure at the inner side gas channel (110c) is reduced relatively, so that it is possible for the mixed fuel gas not to be sprayed smoothly through the mixed spray hole (115a).

The aforementioned mixed supply pipe (117) is combined with the mixed housing (111), and supplies the mixed fuel gas to the mixed gas channel (110b). The aforementioned mixed supply pipe (117) could be combined with the mixed outer wall hole (112a) of the mixed outer wall ring (112). However, the aforementioned mixed supply pipe (117) could be combined with the mixed upper panel ring (113) or mixed lower panel ring (114) of the mixed housing (111). Additionally, there could be more than one of the aforementioned mixed supply pipes (117) depending on the diameter or height of the mixed housing (11) to be combined at certain interval with the mixed outer wall ring (112) according to the circumference direction or height direction.

The aforementioned mixed supply pipe (117) could be combined vertically to the tangent of the mixed guide ring (116) so that the mixed fuel gas is supplied in the direction of the center of the mixed housing (111). Additionally, the aforementioned mixed supply pipe (117) is combined with the tangent of the mixed guide ring (116) of the mixed housing (111) at a certain angle so that the mixed fuel gas can flow by rotating along the mixed gas channel (110b) of the mixed housing (111). More specifically, the aforementioned mixed supply pipe (117) could supply the mixed fuel gas in such a way as the mixed fuel gas flows along the mixed outer side gas channel (110d) of the mixed housing (111).

The aforementioned mixed supply pipe (117) supplies mixed fuel gas in which fuel, air, and oxygen are mixed. The aforementioned mixed fuel gas contains as oxidizer air and oxygen, so that stability of the flame formed along the inner circumference of the mixed spray ring (115) increases, and the flame's temperature increases.

The aforementioned mixed supply pipe (117) could further include a mixed spray panel (118). The aforementioned mixed spray panel (118) is formed in the shape of a panel with certain thickness. The aforementioned mixed spray panel (118) could be positioned near the end area of the mixed supply pipe (117). The aforementioned mixed spray panel (118) is located in the vertical direction to the central axis of the mixed supply pipe (117). The aforementioned mixed spray panel (118) prevents the mixed fuel gas supplied to the mixed supply pipe (117) from being directly sprayed to the mixed guide ring (116).

The aforementioned preheating burner module (120) could include a preheating housing (121), a preheating spray ring (125), a preheating guide ring (126), and a preheating supply pipe (127). The aforementioned preheating burner module (120) is located at the lower part of the scrubber burner (100). Namely, the aforementioned preheating burner module (120) is combined to the lower part of the mixed burner module (110). The aforementioned preheating burner module (120) is equipped with a preheating combustion space (120a) into which emission gas flows and the preheating gas channel (120b) into which preheating fuel gas is supplied. The aforementioned preheating combustion space (120a) is formed inside the preheating spray ring (125) that is located at the inner side of the preheating housing (121).

On the other hand, if the aforementioned scrubber burner is formed only with a preheating burner module (120), the preheating housing (121) could be indicated as housing, the preheating gas channel (120b) could be indicated as gas channel, and the preheating fuel gas could be indicated as fuel gas. Additionally, the aforementioned preheating spray ring (125), preheating guide ring (126), and preheating supply pipe (127) could be indicated as guide ring, spray ring, and supply pipe, respectively.

The aforementioned preheating combustion space (120a) is connected to the mixed combustion space (110a) at the upper part. Therefore, the emission gas combusted at the aforementioned mixed combustion space (110a) flows into the preheating combustion space (120a) at the lower part. The aforementioned preheating gas channel (120b) is formed between the inner part of the preheating housing (121) and the outer circumference of the preheating guide ring (126). The aforementioned preheating gas channel (120b) is connected to the preheating supply pipe (127). The aforementioned preheating fuel gas is sprayed through the preheating spray ring (125) and forms flames in the preheating combustion space (120a) along the inner circumference of the preheating spray ring (125). The aforementioned preheating burner module (120) treats the emission gas that flows into the preheating combustion space (120a) from the mixed combustion space (110a) by using flames. The aforementioned preheating burner module (120) emits the combusted emission gas to the lower part.

There is at least one preheating burner module (120), and multiple preheating burner modules could be layered vertically. Additionally, there could be multiple preheating burner modules (120) with different heights.

The aforementioned preheating housing (121), preheating guide ring (126), and preheating supply pipe (127) could be formed in the same way or similarly to the mixed housing (111), mixed guide ring (116), and mixed supply pipe (117). Therefore, the description of the aforementioned preheating housing (121), preheating guide ring (126), and preheating supply pipe (127) will be focused on the difference from the mixed housing (111), mixed guide ring (116), and mixed supply pipe (117).

The aforementioned preheating housing (121) is formed inside with a preheating gas channel (120b) in the shape of a ring through which preheating fuel gas flows, and the inner side is opened to the preheating combustion space (120a). The aforementioned preheating gas channel (120b) could be located at the outer side of the preheating combustion space (120a). The aforementioned preheating gas channel (120b) could be formed in such a way to wrap the outer circumference of the preheating combustion space (120a). Additionally, the aforementioned preheating housing (121) is formed in the shape of a ring equipped with a preheating housing hole (121a) that penetrates from the upper part to the lower part of the inner side. The aforementioned preheating housing hole (121a) opens the preheating combustion space (120a) vertically. The aforementioned preheating gas channel (120b) is connected to the preheating combustion space (120a), and the preheating fuel gas that flows in is sprayed to the preheating combustion space (120a). The aforementioned preheating housing (121) could include a preheating outer wall ring (122), a preheating upper panel ring (123), and a preheating lower panel ring (124). On the other hand, the aforementioned preheating housing (121)'s lower part is opened, and could be closed by the lower part spray module (130).

The preheating fuel gas that flows into the aforementioned preheating housing (121) flows along the preheating gas channel (120*b*) and passes through the preheating guide ring (126) to pass through the preheating spray ring (126) to be sprayed in the preheating fuel space. The aforementioned preheating outer wall ring (122) could be equipped with a preheating outer wall hole (122*a*).

The aforementioned preheating spray ring (126) is formed in the shape of a ring with certain thickness, certain inner diameter, and certain height. The aforementioned preheating spray ring (125) could be formed with less thickness than the thickness or sum corresponding to the thickness or sum of the mixed spray ring (115) of the mixed burner module (110) and width of the mixed inner side gas channel (110*c*). The aforementioned preheating spray ring (125)'s outer circumference could come into contact or separated from the inner circumference of the preheating guide ring (126). Additionally, the aforementioned preheating spray ring (125) could be formed with the same inner diameter as that of the mixed spray ring (115). The inner circumference of the aforementioned preheating spray ring (125) could form a side that is identical to the inner circumference of the mixed spray ring (115). Therefore, the emission gas that flows from the mixed combustion space (110*a*) of the aforementioned mixed spray ring (115) could flow softly into the preheating combustion space (120*a*) of the preheating spray ring (125). The aforementioned preheating spray ring (125) could be formed with height that corresponds to the height of the preheating housing (121). The aforementioned preheating spray ring (125) combines with the preheating housing hole (121*a*) of the preheating housing (121). Additionally, the aforementioned preheating spray ring (125) could be combined by being supported between the preheating upper panel ring (123) and the preheating lower panel ring (124) of the preheating housing (121). The aforementioned preheating spray ring (125) could separate the preheating as channel (120*b*) and the preheating combustion space (120*a*) spatially.

The aforementioned preheating spray ring (125) could be formed with a porous material. The aforementioned preheating spray ring (125) could be formed with all porous materials including a perforated plate, metal fibers, metal foams, packed beads, ceramic foams, and porous sintered metals. Therefore, the aforementioned preheating spray ring (125) could include inside multiple holes that are connected from the inner circumference to the outer circumference. Multiple holes formed inside the aforementioned preheating spray ring (125) act as spray nozzle that spray preheating fuel gas. The aforementioned preheating spray ring (125) evenly sprays preheating fuel gas, so that flames could be formed uniformly and maintained stably. Additionally, due to the fact that the aforementioned preheating spray ring (125) is formed in certain thickness, it is possible to preheat and spray the preheating fuel gas that flows into the outer circumference. Therefore, the aforementioned preheating spray ring (125) ensures that flames are formed stably. The aforementioned preheating spray ring could be formed with sufficient thickness necessary for the preheating of preheating fuel gas.

The aforementioned preheating guide ring (126) is formed in the shape of a ring corresponding to the preheating spray ring (125), and its inner diameter could be formed in the size that corresponds to the outer diameter of the preheating spray ring (125). The aforementioned preheating guide ring (126) could be formed in such a way that the inner circumference comes into contact with the outer diameter of the preheating spray ring (125). Therefore, it is possible for the aforementioned preheating burner module (120) to have no channel that corresponds to the mixed inner side gas channel (110*c*) of the mixed burner module (110).

The aforementioned preheating guide ring (126) is formed with multiple preheating guide holes (126*a*) that penetrate from the outer circumference to the inner circumference. The aforementioned preheating guide holes (126*a*) are formed to be distributed over the entire preheating guide ring (126). The aforementioned preheating guide hole (126*a*)'s supplied preheating fuel gas is directly supplied to the preheating spray ring (125).

The aforementioned preheating supply pipe (127) combines with the preheating housing (121), and supplies preheating fuel gas to the preheating gas channel (120*b*). The aforementioned preheating supply pipe (127) could be combined with the preheating outer wall hole (122*a*) of the preheating outer wall ring (122). The aforementioned preheating supply pipe (127) could further include a preheating spray panel (128). The aforementioned preheating spray panel (128) is formed in the shape of a panel with certain thickness. The aforementioned preheating spray panel (128) could be positioned near the end of the preheating supply pipe (127). The aforementioned preheating spray panel (128) is positioned in the vertical direction at the central axis of the preheating supply pipe (127). The aforementioned preheating spray panel (128) ensures that the preheating fuel gas supplied to the preheating supply pipe (127) is not directly sprayed to the preheating guide ring (126).

The aforementioned lower spray module (130) includes a lower housing (131) and a lower spray ring (135). Additionally, the aforementioned lower spray module (130) could further include a lower separation panel (137). The aforementioned lower spray module (130) is located at the lower part of the preheating burner module (120). The aforementioned lower spray module (130) is equipped with lower combustion space (130*a*) into which emission gas flows. The aforementioned lower combustion space (130*a*) is formed inside the lower spray ring (135) located at the inner side of the lower housing (131). Additionally, the aforementioned lower spray module (130) includes a lower gas channel (130*b*). The aforementioned lower gas channel (130*b*) is formed between the outer circumference of the lower spray ring (135) inside of the lower housing (131). The aforementioned lower gas channel (130*b*) provides a route through which the lower fuel gas or oxidizer flows. The aforementioned lower gas channel (130*b*) is connected to a separate lower supply pipe (not illustrated). The aforementioned lower fuel gas could additionally combust emission gas by being sprayed through the lower spray ring (135). The aforementioned lower spray module (130) could spray an oxidizer besides the lower fuel gas. Here, the aforementioned oxidizer could be gas containing oxygen or ozone.

The aforementioned lower housing (131) is formed with a lower gas channel (130*b*) in the shape of a ring through which the lower fuel gas flows, and the inner side is opened to the lower fuel combustion space (130*a*). Additionally, the aforementioned lower housing (131) is formed in the shape of a ring equipped with a lower housing hole (131*a*) that penetrates from the upper part to the lower part at the inner side. The aforementioned lower housing (131) is opened at the inner side so that the vertical cross-section is formed in the shape of "⊏." The aforementioned lower housing hole (131a) vertically opens the lower combustion space (130a). The aforementioned lower gas channel (130b) is connected to the lower combustion space (130a), and the lower fuel gas that flows in is sprayed to the lower combustion space (130a).

The aforementioned lower housing (131) is formed by being equipped with a lower outer wall hole (131b). The aforementioned lower outer wall hole (131) is formed by penetrating from the outer circumference to the inner circumference, and is connected to the lower gas channel (130b). The aforementioned lower outer wall hole (131b) could be combined with the lower supply pipe.

The aforementioned lower spray ring (135) is formed in the shape of a ring with certain thickness and height. The aforementioned lower spray ring (135) is formed so that its inner diameter corresponds to the lower housing hole (131a), and is combined with the lower housing hole (131a) of the lower housing (131). Additionally, the aforementioned lower spray ring (135) is combined with the inner side of the lower gas channel (130b). The aforementioned lower spray ring (135) separates the lower gas channel (130b) and the lower combustion space (130a) spatially.

The aforementioned lower spray ring (135) could be equipped with multiple lower spray holes (135a) that penetrate from the outer circumference to the inner circumference. The aforementioned lower spray hole (135a) could act as spray nozzle that spray the lower fuel gas. There could be more than one lower spray holes (135a) that are separated along the circumference direction of the lower spray ring (135). Additionally, the aforementioned lower spray hole (135a) could be formed by being separated in the vertical direction. The aforementioned lower spray hole (135a) could be formed in such a way to slope downward toward the inner side. Therefore, the aforementioned lower spray hole (135a) could be spray in such a way that the lower fuel gas is sprayed downward in the direction of the center of the lower housing (131).

The aforementioned lower separation panel (137) is formed in the shape of a ring with certain thickness, and could be formed with the flat surface shape corresponding to the flat surface shape of the lower gas channel (130b). With the aforementioned lower separation panel (137), the outer diameter corresponds to the outer diameter of the lower gas channel (130b), and the inner diameter corresponds to the inner side diameter of the lower gas channel (130b). Therefore, the aforementioned lower separation panel (137)'s outer circumference comes into contact with the inner circumference of the lower gas channel (130b), and the inner circumference comes into contact with the outer circumference of the lower spray ring (135).

The aforementioned lower separation panel (137) could be located at the middle height of the lower gas channel (130b) in the vertical direction. The aforementioned lower separation panel (137) could separate the lower gas channel (130b) vertically. Therefore, the aforementioned lower gas channel (130b) could be formed with the mixed lower gas channel (130c) and the second lower gas channel (130d). Additionally, the aforementioned lower spray module (130) could be formed with a lower outer wall hole (131b) at each of the mixed lower gas channel (130c) and second lower gas channel (130d). Additionally, the aforementioned lower spray ring (135) could be formed with a lower spray hole (135a) at each of the mixed lower gas channel (130c) and the second lower gas channel (130d). Therefore, the aforementioned lower spray module (130) could spray different fuel gases at the mixed lower gas channel (130c) and at the second lower gas channel (130d). For example, the aforementioned mixed lower gas channel (130c) could spray fuel for additional combustion in order to reduce the amount of nitrogen oxide contained in the combusted emission gas. Namely, due to the fact that the emission gas flowing from the aforementioned preheating burner module (120) to the lower part is in a solid state, it is possible to reduce nitrogen oxide by additionally supplying and combusting fuel. Additionally, the aforementioned second lower gas channel (130d) could spray an oxidizer to eliminate nitrogen oxide or carbon hydrogen products. Namely, it is possible to eliminate carbon hydrogen products by additionally spraying oxidizers such as oxygen on the emission gas that flows from the aforementioned preheating burner module (120) to the lower part.

The aforementioned upper head module (140) could include an upper head (141) and a waste gas inflow tube (142). The aforementioned upper head module (140) could combine with the upper part of the mixed burner module (110) to seal the upper part of the upper head module (140) to supply waste gas to the mixed burner module (110). For the aforementioned upper head module (140), upper head modules (140) with various structures that are used on scrubbers that treat semiconductor waste gas could be used. For example, the aforementioned upper head module (140) could be composed of two, three, or four waste gas inflow pipes (142), as illustrated in FIGS. 5(a), (b), and (c).

The aforementioned upper head (141) could be formed in the shape of a rough cone. The aforementioned upper head (141) could be formed in various shapes necessary to seal the upper part of the mixed burner module (110). The lower part of the aforementioned upper head (141) could be formed in a flat surface shape that corresponds to the upper part of the mixed burner module (110). The lower part of the aforementioned upper head (141) combines with the upper part of the mixed burner module (110), and seals the upper part of the mixed burner module (110). More specifically, the lower side of the aforementioned upper head (141) is combined with the upper part of the mixed combustion space (110a) of the mixed burner module (110) to seal the upper part of the mixed combustion space (110a).

The aforementioned upper head (141) could include a waste gas inflow channel (141a). The aforementioned waste gas inflow channel (141a) could be connected with the mixed combustion space (110a) by penetrating from the upper part to the lower side of the upper head (141). The aforementioned waste gas inflow channel (141a) provides a channel into which waste gas flows into the combustion space (110a). There could be at least two waste gas inflow channels (141) depending on the amount of waste gas that flows in and depending on the structure of the upper head (141). There could be three or four waste gas inflow channels (141a) formed. The aforementioned waste gas inflow channel (141a) supplies waste gas flowing from outside to the mixed combustion space (110a).

The aforementioned waste gas inflow channel (142) is formed in the shape of a pipe, and is combined to the outer side of the waste gas inflow channel (141a) of the upper head (141). The number of the aforementioned waste gas inflow pipes (142) could correspond to the number of waste gas inflow channels (141a) of the upper head (141). The aforementioned waste gas inflow pipe (142) could be connected to main process line pipe (not illustrated). The aforementioned waste gas inflow pipe (142) supplies the waste gas that flows into the process line to the waste gas inflow channel (141a) of the upper head (141).

On the other hand, at the lower part of the aforementioned scrubber burner (100), a water tank (not illustrated) installed at the combustion component (not illustrated) and on the lower part of the combustion component is installed, although not specifically illustrated, and a water treatment component (not illustrated) could additionally be installed on the upper part of the water tank.

Below, the scrubber burner in accordance with another embodiment of the present invention will be described.

Figure 6:
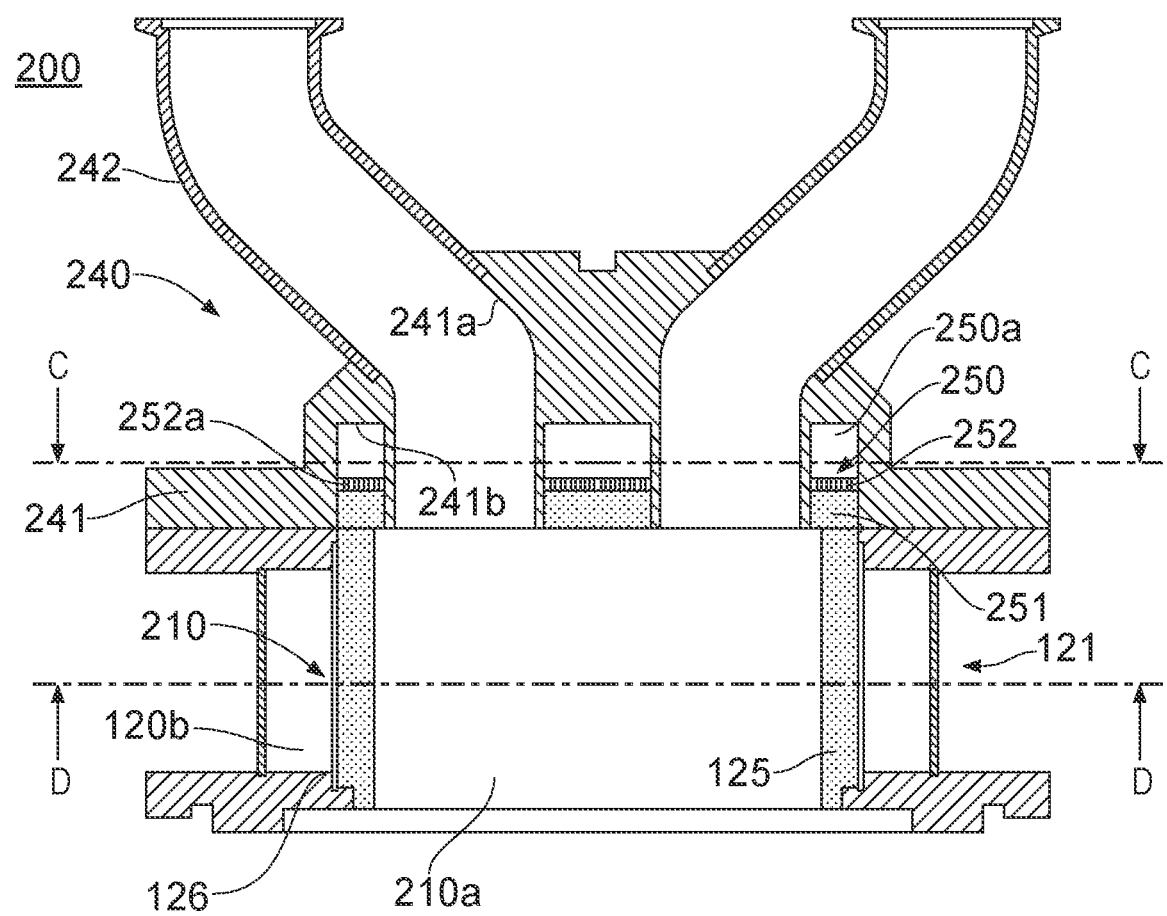
FIG. 6 is vertical cross-sectional diagram of the scrubber burner in accordance with another embodiment of the present invention.
Figure 7:
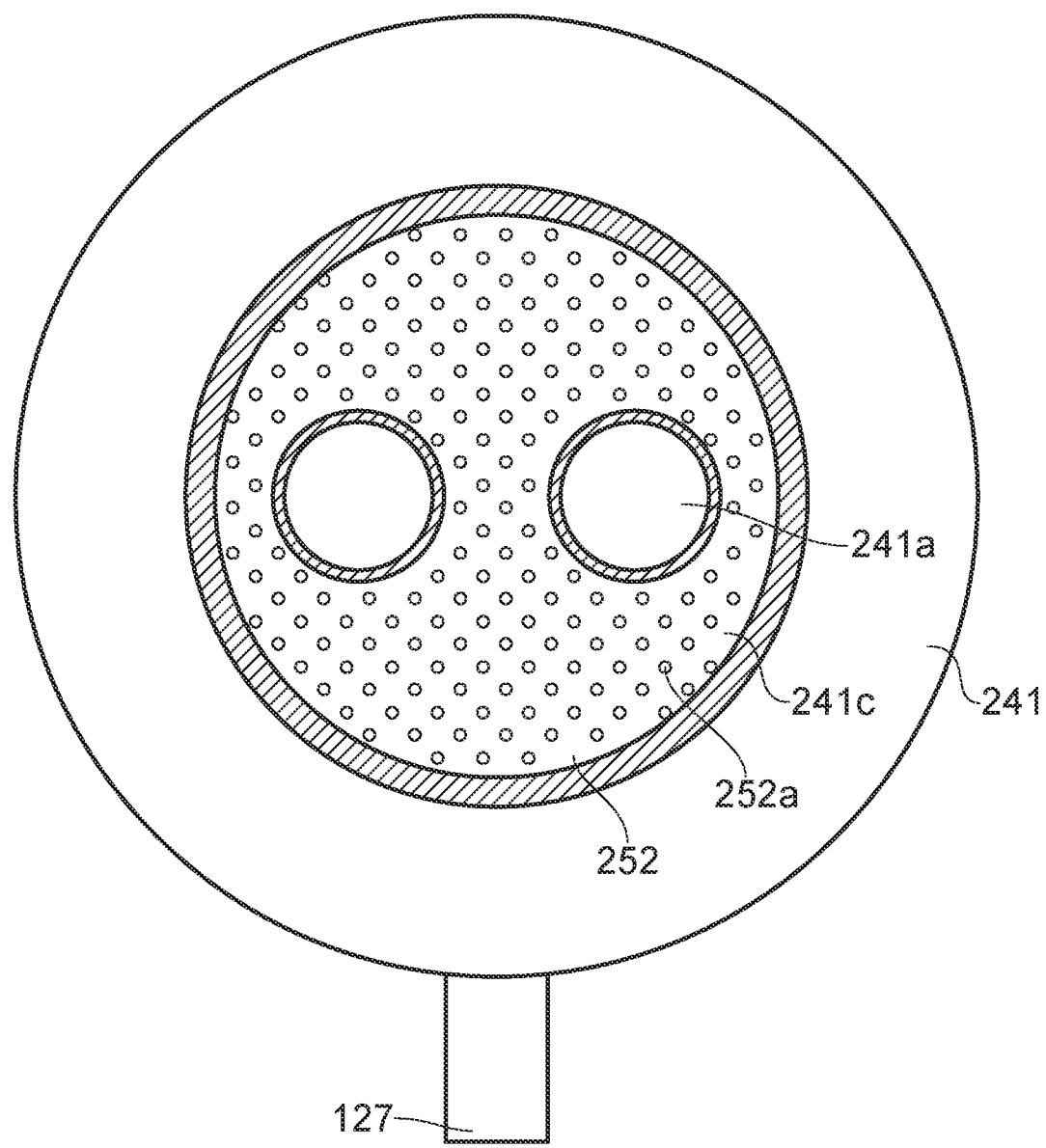
FIG. 7 is a horizontal cross-sectional diagram in accordance with C-C of FIG. 6.
Figure 8:
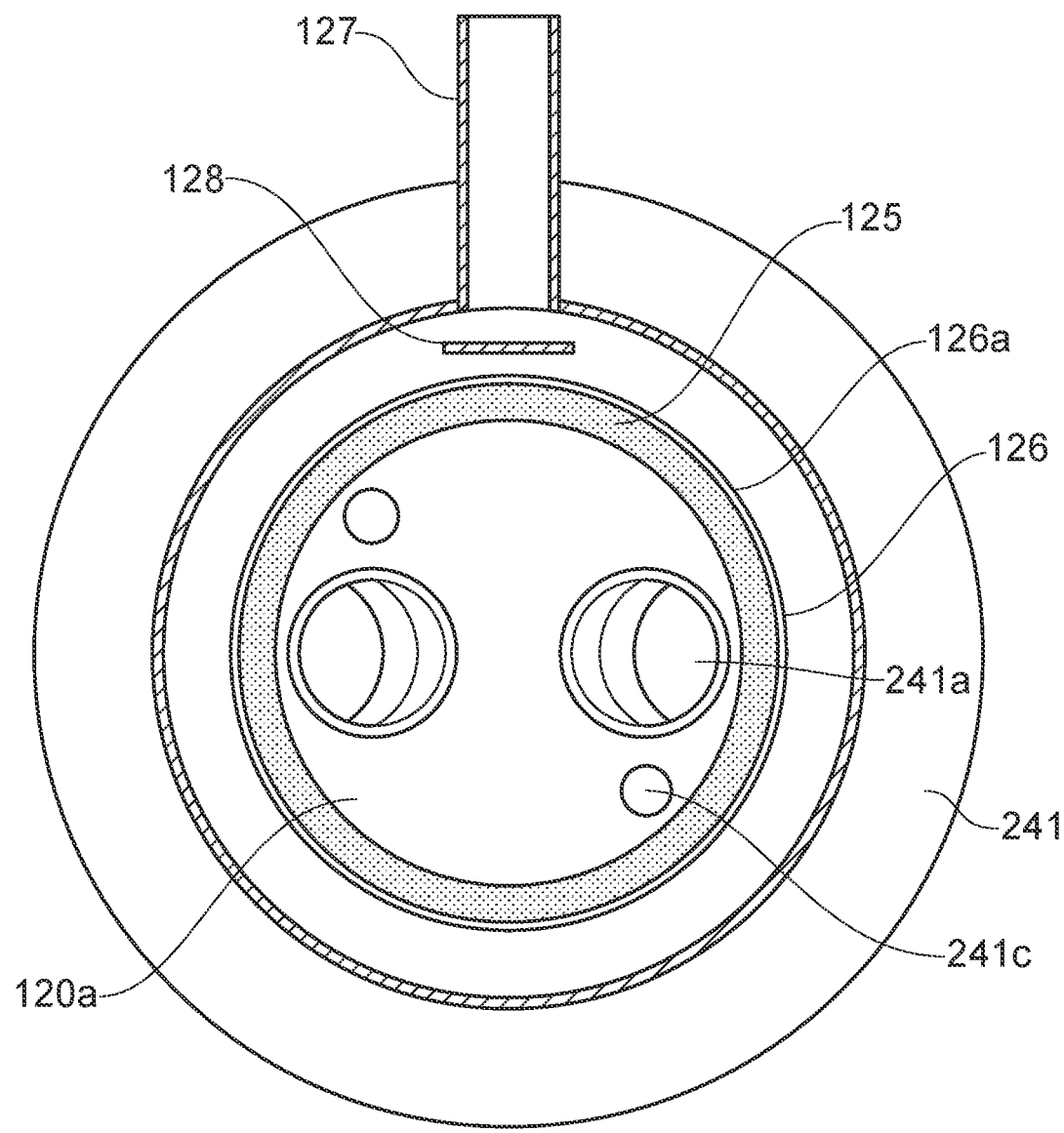
FIG. 8 is a horizontal cross-sectional diagram in accordance with D-D of FIG. 6.

FIG. 6 is a vertical cross-sectional diagram of the scrubber burner in accordance with another embodiment of the present invention. FIG. 7 is a horizontal cross-sectional diagram in accordance with C-C of FIG. 6. FIG. 8 is a horizontal cross-sectional diagram in accordance with D-D of FIG. 6.

The scrubber burner (200) in accordance with another embodiment of the present invention could include the main burner module (210), the upper head module (240), and the upper burner module (250). Although not specifically illustrated, with the aforementioned scrubber burner (200) the lower burner module (130) of FIG. 1 to FIG. 5 could be located at the lower part of the main burner module (210). Additionally, with the aforementioned scrubber burner, as with the scrubber burner (100) of FIG. 1 to FIG. 5, the main burner module (210) could be formed with a burner module (110) and a preheating burner module (120), or there could be more than one of any of the two.

Additionally, the aforementioned scrubber burner (200) could be formed by additionally including the upper burner module (250) in comparison to the scrubber burner (100) in accordance with FIG. 1 to FIG. 5. Additionally, in comparison with the scrubber burner (100) in FIG. 1 to FIG. 5, the upper head module (240) of the scrubber burner (200) could be formed differently. Additionally, the main burner module (210) of the aforementioned scrubber burner (200) could be formed in the same way or similar to the mixed burner module (110) or preheating burner module (120) of FIG. 1 to FIG. 5. Therefore, below the aforementioned scrubber burner (200) will be described with the focus on the upper head module (240) and the upper burner module (250). Additionally, for the aforementioned scrubber burner (200), for the same or similar structures of the scrubber burner (100) in FIG. 1 to FIG. 5, the same numbers could be assigned and specific descriptions could be omitted.

Due to the fact that the aforementioned scrubber burner (200) forms flames at the side parts and the upper part, it is possible to treat waste gas more efficiently. Namely, the aforementioned scrubber burner (200) is able to combust waste gas by using the flames formed by the main burner module (210) at a side part of the main combustion space (210*a*), and using the flames formed by the upper burner module (250) at the upper part of the main combustion space (210*a*).

The aforementioned main burner module (210) could be formed in the same structure or similar structure as the preheating burner module (120). For example, the aforementioned main burner module (210) could include a preheating housing (121), a preheating spray rig (125), a preheating guide ring (126), and a preheating supply pipe (127). Additionally, the aforementioned main burner module (210) could further include a preheating spray panel (128). On the other hand, the aforementioned main burner module (210) could be formed in the same or similar structure as the mixed burner module (110). Here, specific description of the aforementioned main burner module (210) will be omitted.

On the other hand, if the aforementioned scrubber burner is formed only with the preheating burner module (120), it is possible to indicate the preheating housing (121) as housing, indicate the preheating gas channel (120*b*) as gas channel, and indicate the preheating fuel gas as fuel gas.

Additionally, the aforementioned preheating spray ring (125), preheating guide ring (126), and preheating supply pipe (127) could be indicated as guide ring, spray ring, and supply pipe, respectively.

The aforementioned main burner module (210) could include a preheating gas channel (120*b*). The aforementioned main burner module (210) sprays the main combustion gas to form flames at the main combustion space (210*a*). The aforementioned main combustion gas could be identical to the preheating combustion gas. Additionally, the aforementioned main combustion gas could be identical to the mixed combustion gas.

The aforementioned upper head module (240) could include an upper head (241) and a waste gas inflow pipe (142). The aforementioned upper head module (240) could be combined with the upper part of the main burner module (210) to seal the upper part of the main burner module (210). Additionally, the aforementioned upper head module (240) could supply waste gas to the main combustion space (210*a*).

The aforementioned upper head (241) could include a waste gas inflow channel (241), a burner-containing groove (241*b*), and an upper fuel supply channel (241*c*). The upper head (241) could be formed in the shape of a rough cone. The aforementioned upper head (241) could be formed in various shapes necessary to seal the upper part of the main burner module (210). The lower part of the aforementioned upper head (241) could be formed in a flat surface shape corresponding to the upper part of the main burner module (210). The aforementioned upper head (241)'s lower part is combined with the upper part of the main burner module (210), and seals the upper part of the main burner module (210). More specifically, the aforementioned upper head (241)'s lower side is combined with the upper part of the main combustion space (210*a*) of the main burner module (210) to seal the upper part of the preheating combustion space (120*a*).

The aforementioned waste gas inflow channel (241) could penetrate from the upper part to the lower side of the upper head (241) to connect with the main combustion space (210*a*). There could be at least two waste gas inflow channels (241*a*) formed.

The aforementioned burner-containing groove (241*b*) is formed from the lower side to the upper part in certain containing height. The aforementioned burner-containing groove (241*b*) be formed in the upper head (241) with the inner diameter that corresponds to the diameter of the main combustion space (210*a*). Additionally, the aforementioned burner-containing groove (241*b*) could be formed to have an inner diameter that corresponds to the outer diameter of the preheating spray ring (125). The aforementioned burner-containing groove (241*b*) could be formed in the area that includes the space between the waste inflow channels (241*a*). Namely, the aforementioned burner-containing groove (241*b*) is in the shape of a cone with containing height, and could be formed in the shape in which a waste gas inflow channel (241*a*) that penetrates from the upper part to the lower part is formed. The aforementioned burner-containing groove (241*b*) provides space where the aforementioned burner module (250) is contained.

The aforementioned upper fuel supply channel (241*c*) is formed by penetrating from the outer side of the upper head (241) to the burner-containing groove (241*b*). There could be one or at least two upper fuel supply channels (241*c*). If at least two upper fuel supply channels (241*c*) are formed, it is possible to position them separately in the circumference direction with the center of the burner-containing groove (241b) as the reference point. Additionally, the aforementioned upper fuel supply channel (241) could be formed by penetrating from the upper side center of the upper head (241) to the center of the burner-containing groove (241b). The aforementioned upper fuel supply channel (241c) provides a route through which the upper fuel gas is supplied to the burner-containing groove (241b).

The aforementioned upper burner module (250) could include an upper spray panel (251) and an upper guide panel (252). The aforementioned upper burner module (250) combines with the burner-containing groove (241b) of the upper head (241), and the upper side of the upper guide panel (252) is combined by being separated from the inner upper side of the burner-containing groove (241b). Therefore, the aforementioned upper burner module (250) could form an upper gas channel (250a) at the upper part of the burner-containing groove (241). The aforementioned upper gas channel (250a) supplies the upper fuel gas that is supplied through the upper fuel supply channel (241c) through the upper guide panel (252). The aforementioned upper burner module (250) could form flames in the main combustion space (210a) by supplying the upper fuel gas to the main combustion space (210a).

The aforementioned upper spray panel (251) has certain thickness, and could be formed in the shape that corresponds to the flat surface shape of the burner-containing groove (241b). The aforementioned upper spray panel (251) is roughly in the shape of a disk, and the outer diameter could be identical to or larger than the inner diameter of the preheating spray ring (125). Additionally, the aforementioned upper spray panel (251) could be combined to the upper side of the preheating spray ring (125). The aforementioned upper spray panel (241) is formed with a waste gas inflow channel (241a) that penetrates from the upper side to the lower side at the inner side. The aforementioned upper spray panel (251) could be formed with the same material as the material for the preheating spray ring (125). The aforementioned upper spray panel (251) is combined with the burner-containing groove (241b), and could seal the lower part of the burner-containing groove (241b). The aforementioned upper spray panel (251) could be combined so that the lower side forms the same flat surface as the lower side of the upper head (241). The aforementioned upper spray panel (251) could seal the lower part of the burner-containing groove (241b).

The aforementioned upper spray panel (251) has multiple holes that are formed inside and act as spray nozzles, and ensures that the upper fuel gas is sprayed evenly on the lower part. Additionally, the aforementioned upper spray panel (251) evenly sprays the upper fuel gas on the lower part, so flames are formed uniformly and maintained. Additionally, since the aforementioned upper spray panel (251) is formed with certain thickness, it is possible to preheat and spray the upper fuel gas that flows from the upper side. Therefore, the aforementioned upper spray panel (251) ensures that flames are formed stably.

The aforementioned upper guide panel (252) has certain thickness, and the upper spray panel (251) is formed in the shape that corresponds to the flat surface shape of the upper spray panel (251). The aforementioned upper guide panel (252) could be combined in such a way that the lower side comes into contact with the upper side of the upper spray panel (251). Additionally, the aforementioned upper guide panel (252)'s lower side could be combined in such a way as to be separated from the upper side of the upper spray panel (251).

The aforementioned upper guide panel (252) is formed by being installed with multiple upper guide holes (252a) that penetrate from the upper side to the lower side. The aforementioned upper guide hole (252a) could be formed by being distributed overall on the upper guide panel (252). The aforementioned upper guide hole (252a) ensures that the upper fuel gas that is supplied is supplied directly to the upper spray panel (251).

Next, the scrubber burner in accordance with another embodiment of the present invention will be described.

Figure 9:
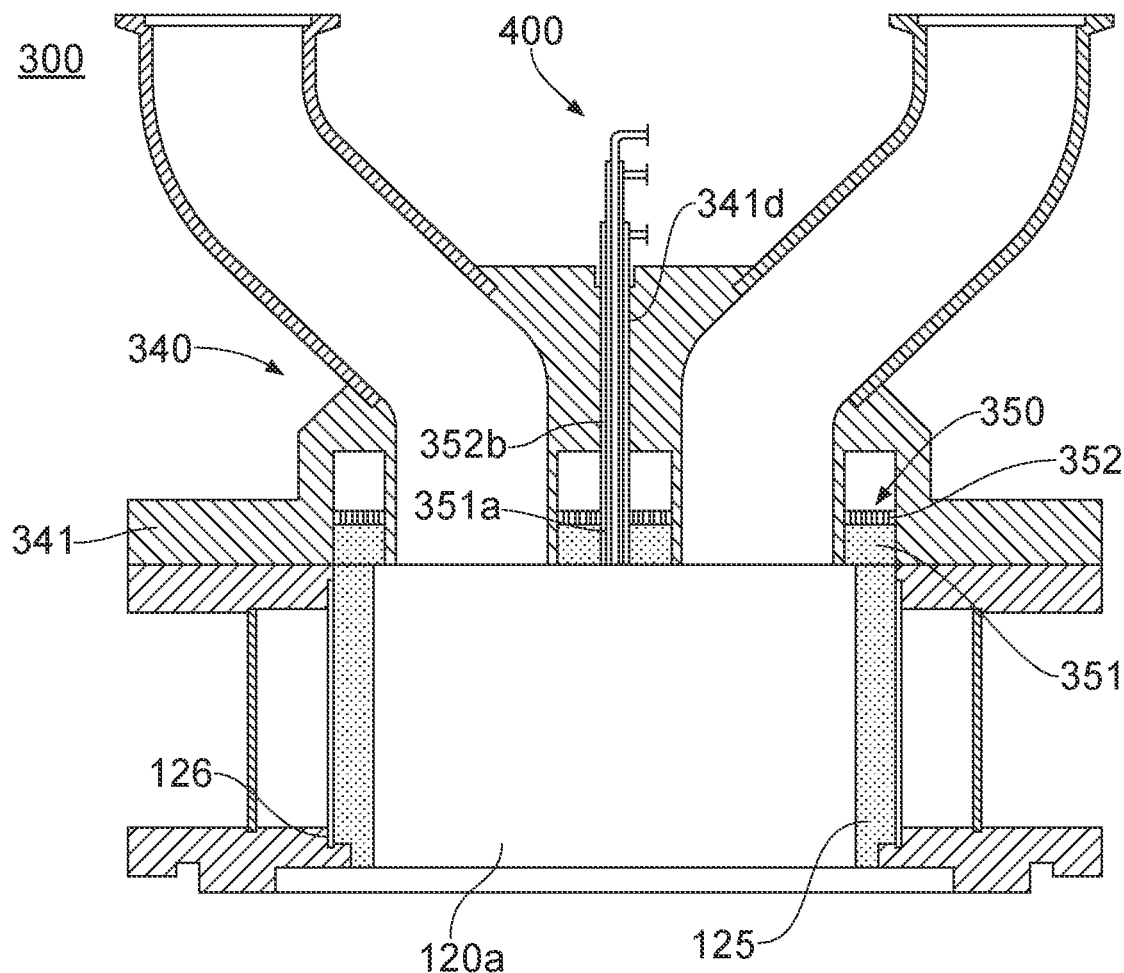
FIG. 9 is a vertical cross-sectional diagram of the scrubber burner in accordance with another embodiment of the present invention.
Figure 10:
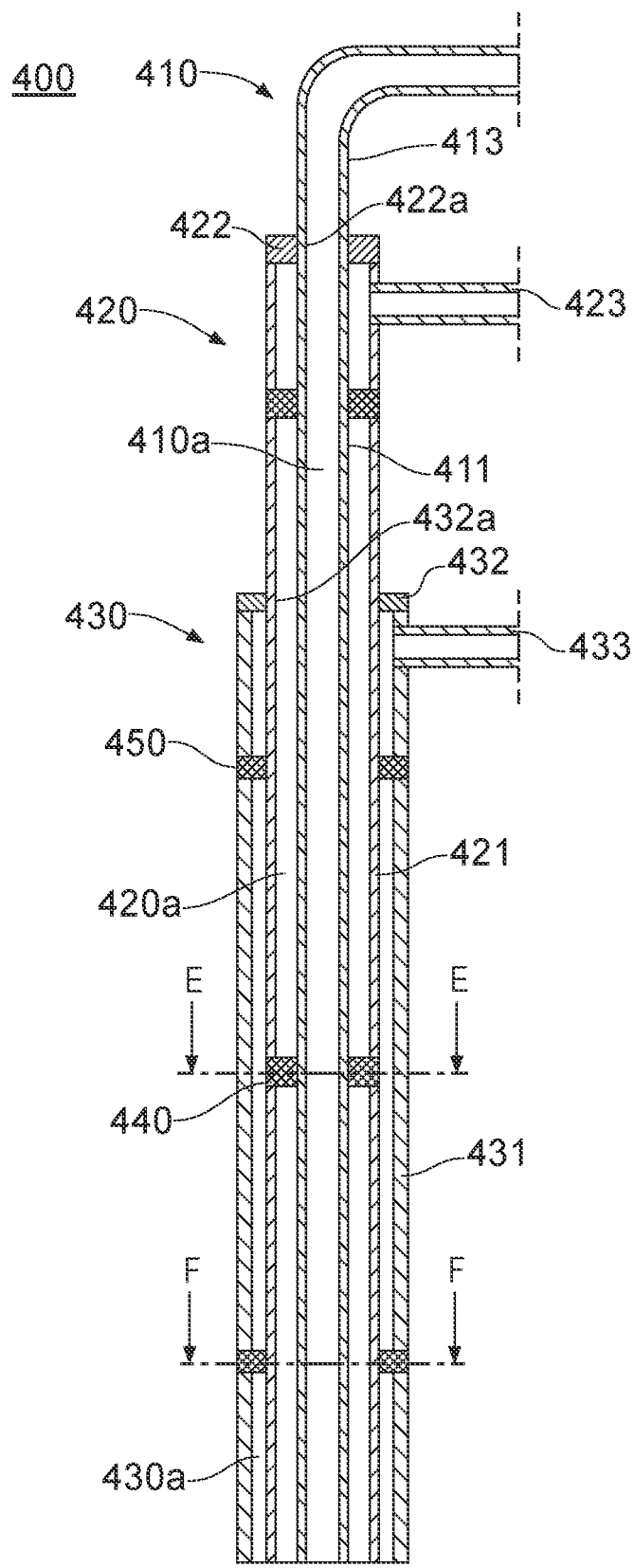
FIG. 10 is an expanded diagram of the reverse expansion burner of FIG. 9.
Figure 11:
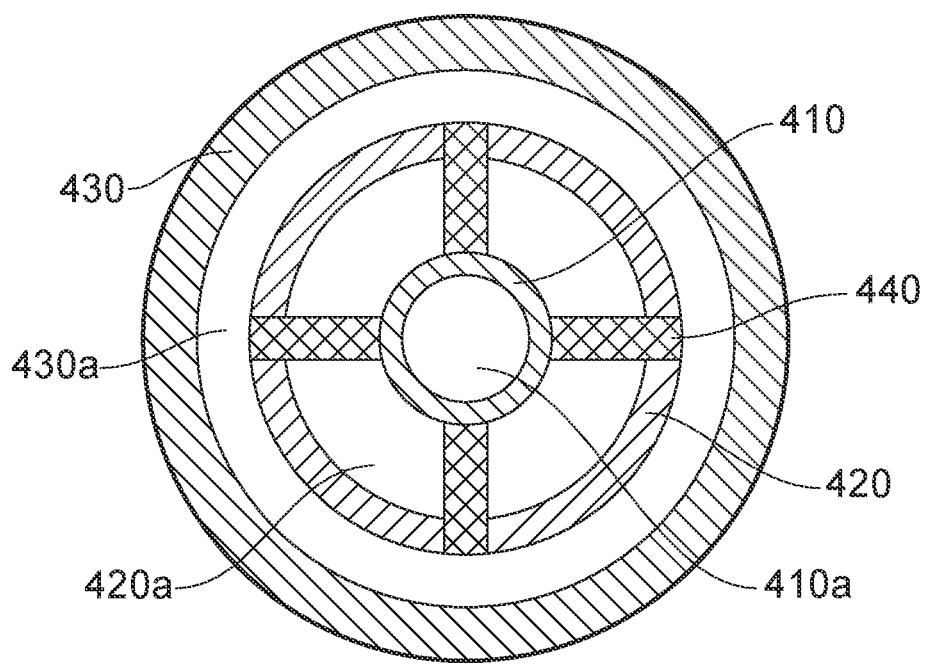
FIG. 11 is a horizontal cross-sectional diagram of E-E of FIG. 10.
Figure 12:
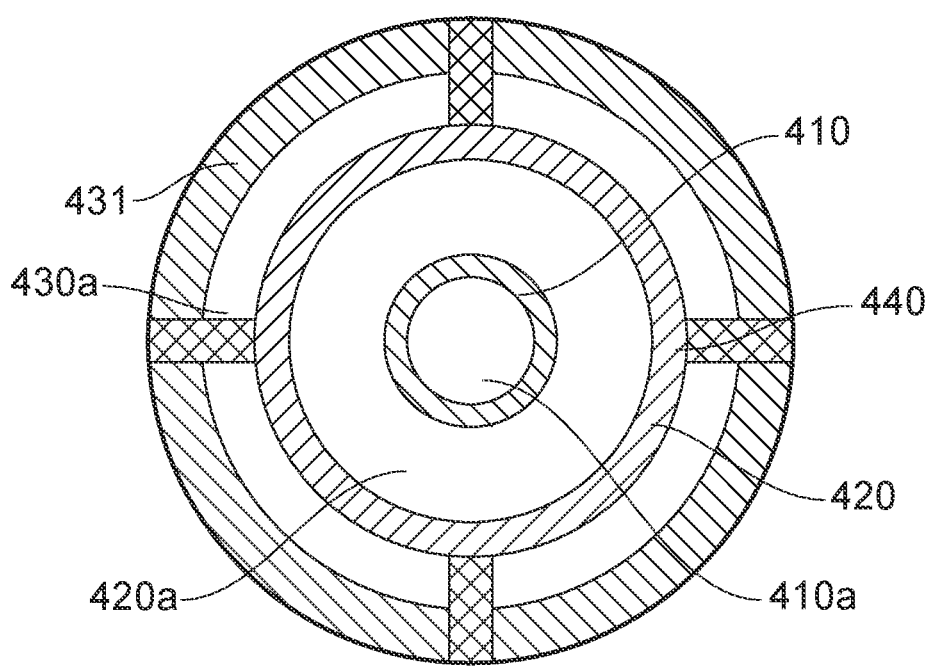
FIG. 12 is a horizontal cross-sectional diagram of F-F of FIG. 10.

FIG. 9 is a vertical cross-sectional diagram of the scrubber burner in accordance with another embodiment of the present invention. FIG. 10 is an expanded diagram of the reverse expansion burner of FIG. 9. FIG. 11 is a horizontal cross-sectional diagram of E-E of FIG. 10. FIG. 12 is a horizontal cross-sectional diagram of F-F of FIG. 10.

The scrubber burner (300) in accordance with another embodiment of the present invention includes a main burner module (210), an upper head module (340), an upper burner module (350), and a reverse expansion burner (400), when we refer to FIG. 9 to FIG. 12. Although not illustrated specifically, with the aforementioned scrubber burner (300), the lower burner module (130) of FIG. 1 to FIG. 5 could be located at the lower part of the main burner module (210). Additionally, with the aforementioned scrubber burner, as shown in FIG. 1 through FIG. 5 the main burner module (210) could be formed with a mixed burner module (110) and a preheating burner module (120), or with two or more of these components.

The aforementioned scrubber burner (300) could be formed by adding a reverse expansion burner (400) in comparison to the scrubber burner in accordance with FIG. 6 to FIG. 8. The aforementioned scrubber burner (300) is formed identical or similar to the scrubber burner (200) in accordance with FIG. 6 to FIG. 8 except for the fact that a channel where a reverse expansion burner (400) is combined to the upper burner module (350) is formed. Therefore, the aforementioned scrubber burner (300) will be described with the focus on the components that differ from those of the scrubber burner (200) in accordance with FIG. 6 to FIG. 8. Additionally, the aforementioned scrubber burner (300) is assigned the same numbers for the identical or similar structures as the scrubber burner of FIG. 6 to FIG. 8, and specific descriptions could be omitted. On the other hand, the aforementioned reverse expansion burner (400) could be applied in the same way as the scrubber burner (100) of FIG. 1 to FIG. 5.

With the aforementioned scrubber burner (300), the reverse expansion burner (400) that is installed by penetrating the upper head module (340) and the upper burner module (350) forms flames at the upper part of the main combustion space (210a). Therefore, the aforementioned scrubber burner (300) can treat waste gas more efficiently.

The aforementioned upper head module (340) could include an upper head (341) and a waste gas inflow pipe (142). The aforementioned upper head module (340) could penetrate the upper head (341) to support the reverse expansion burner (400) that is exposed to the main combustion space (210a).

The aforementioned upper head (341) could include a waste gas inflow channel (241a), a burner containing groove (241b), an oxidizer supply channel (241c), and a reverse expansion containing head channel (341d). The aforementioned upper head (341) supports the reverse expansion burner (400) that penetrates from the outer side's upper part to the burner-containing groove (241b).

The aforementioned reverse expansion containing head channel (341d) is formed by penetrating from the outer side center of the upper head (341) to the upper side center of the burner-containing groove (241b). The aforementioned reverse expansion containing head channel (341d) provides a route through which the reverse expansion burner (400) is combined. The aforementioned reverse expansion containing head channel (341d) could be formed with the inner diameter that corresponds to the outer diameter of the reverse expansion burner (400).

The aforementioned upper burner module (350) could include an upper spray panel (351) and an upper guide panel (352). The aforementioned upper burner module (350) supports the reverse burner (400) that penetrates from the upper side to the lower side. Therefore, with the aforementioned upper burner module (350), holes through which the reverse expansion burner (400) penetrate could be formed on the upper spray panel (351) and the upper guide panel (352).

The aforementioned upper spray panel (351) could include a reverse expansion containing spray channel (351a). The aforementioned reverse expansion containing spray channel (351a) is formed by penetrating from the outer side's upper side center to the lower side of the upper spray panel (351). The aforementioned reverse expansion containing spray channel (351a) could be formed by penetrating to the inner side's upper side of the burner-containing groove (241b).

The aforementioned reverse expansion containing spray channel (351a) could be formed with the inner diameter that corresponds to the outer diameter of the reverse expansion burner (400). The aforementioned reverse expansion containing spray channel (351a) supports the penetrating reverse expansion burner (400).

The aforementioned upper guide panel (352) could include a reverse expansion containing guide channel (352b). The aforementioned reverse expansion containing guide channel (352b) is formed by penetrating from the upper side center to the lower side of the upper guide panel (352). The aforementioned reverse containing guide channel (352b) could be formed with the inner diameter that corresponds to the outer diameter of the reverse expansion burner (400). The aforementioned reverse expansion containing guide channel (352b) supports the penetrating reverse expansion burner (400).

When we refer to FIG. 9 to FIG. 11, the aforementioned reverse expansion burner (400) includes the first nozzle (410), the second nozzle (420), and the third nozzle (430). The aforementioned reverse expansion burner (400) could further include the first separation component (440) and the second separation component (450). The aforementioned reverse expansion burner (400) could be formed in such a way that the first nozzle (410), the second nozzle (420), and the third nozzle (430) form a three-pipe form with the same central axis. The aforementioned reverse expansion burner (400) is supported as the upper head module (340) and the upper burner module (350) are penetrated, and forms flames in the main combustion space (210a). The aforementioned reverse expansion burner can combust the waste gas that flows into the main combustion space (210a).

The aforementioned reverse expansion burner (400) can selectively spray fuel and an oxidizer from the first nozzle (410), second nozzle (420), or third nozzle (430) depending on the type of waste gas being treated. For example, the aforementioned first nozzle (410) could spray an oxidizer, the second nozzle (420) could spray fuel, and the third nozzle (430) could spray an oxidizer. Additionally, oxygen content of the oxidizer sprayed from the aforementioned first nozzle (410) and the oxygen content of the oxidizer sprayed from the third nozzle (430) could be different. For example, oxygen content of the oxidizer sprayed from the aforementioned first nozzle (410) could be higher than the oxygen content of the oxidizer sprayed from the third nozzle (430). In such a case, the aforementioned reverse expansion burner (400) could form flames stably at the inner side as the fuel sprayed by the second nozzle (420) expands with the oxidizer sprayed by the first nozzle (410). Additionally, the aforementioned reverse expansion burner (400) could stably maintain flames with the oxidizer sprayed by the third nozzle (430). Additionally, the oxidizer sprayed by the aforementioned first nozzle (410) could have lower oxygen content than the oxygen content of the oxidizer sprayed by the third nozzle (430).

Additionally, the aforementioned first nozzle (410) could spray an oxidizer, and the second nozzle (420) and the third nozzle (430) could spray fuel. In such a case, the aforementioned reverse expansion burner (400) forms flames when the oxidizer sprayed by the first nozzle (410) and the fuel sprayed by the second nozzle (420) and the third nozzle (430) come into contact. Especially, the aforementioned reverse expansion burner (400) could form stable flames at the relatively inner side as fuel expands in the direction of the oxidizer that is sprayed to the inner side.

Additionally, the aforementioned first nozzle (410) could spray an oxidizer, and the second nozzle (420) and the third nozzle (430) each could spray a mixture of fuel and an oxidizer. Additionally, the aforementioned first nozzle (410) and the third nozzle (430) could spray oxidizers, and the second nozzle (420) could spray a mixture of fuel and an oxidizer. In such a case, the aforementioned reverse expansion burner (400) could reduce the production of nitrogen oxide since flames are formed as part of fuel is mixed with an oxidizer in advance and then sprayed.

For the aforementioned oxidizer, oxygen, CDA, air, oxygen+air, oxygen+CDA, oxygen+nitrogen, CDA+nitrogen, air+nitrogen, and oxygen+air+nitrogen could be used. Additionally, for the aforementioned fuel, hydrogen ($H_2$), methane ($CH_4$), propane ($C_3H_8$), and natural gas ($CH_4+C_3H_8+$ etc.) could be used. Additionally, for the aforementioned fuel all carbon hydrogen fuels ($C_nH_m$) could be used.

The aforementioned first nozzle (410) could include the first main body (411) and the first nozzle supply pipe (413). The aforementioned first nozzle (410) cold be located at the inner most side of the reverse expansion burner (400). The aforementioned first nozzle (410) could spray oxidizers. The aforementioned first nozzle (410) could form the first channel (410a) through which an oxidizer flows.

The aforementioned first main body (411) could be formed in the shape of a pipe with the upper part and lower part opened. With the aforementioned first main body (411), the first channel (410a) could be formed inside. The aforementioned first main body (411) could have the first inner diameter, the first outer diameter, and the first height. The aforementioned first main body (411) could have the same first inner diameter at the upper part and the lower part. Additionally, the aforementioned first main body (411) could have the same outer diameter at the upper part and the lower part. Namely, the aforementioned first main body (411) could be formed in the shape of a straight-line pipe. The aforementioned first inner diameter could be of appropriate length according to the amount of oxidizer sprayed. Namely, the aforementioned first inner diameter could be the diameter that corresponds to the horizontal cross-sectional area of the first channel (410a) that is necessary for oxidizers to flow.

The aforementioned first main body (411)'s first outer diameter is determined according to the necessary strength and heat resistance, and could be formed with appropriate thickness. The aforementioned first height could be determined according to the structure of the scrubber on which the reverse expansion burner (400) is installed. The aforementioned first main body (411) could be formed with the lower end forming a flat surface. The aforementioned first main body (411) could be formed with an anticorrosive metallic material such as stainless steel. Since the aforementioned first main body (411) could come into contact with such components as F or Cl, it could be formed with an anticorrosive material.

The aforementioned first nozzle supply pipe (413) could be formed with a pipe with the same inner diameter as the first main body (411). The aforementioned first nozzle supply pipe (413) could be a straight line or curve depending on the location where the reverse expansion burner (400) is formed. The aforementioned first nozzle supply pipe (413)'s lower end is connected to the upper end of the first main body (411), and supplies the oxidizer supplied from outside to the first main body (411).

The aforementioned second nozzle (420) could include the second main body (421), the second sealing ring (422), and the second nozzle supply pipe (423). The aforementioned second nozzle (420) could be located at the outer side of the first nozzle (410) of the reverse expansion burner (400). The aforementioned second nozzle (420) could form at the inner side the second channel (420a) through which either fuel or an oxidizer flows. The aforementioned second nozzle (420) could spray only fuel or a mixture of fuel and an oxidizer.

The aforementioned second main body (421) could be formed in the shape of a pipe with the upper part and the lower part opened. The aforementioned second main body (421) could have the second inner diameter, the second outer diameter, and the second height. With the aforementioned second main body (421), the second inner diameter could be identical at the upper part and the lower part. Additionally, the aforementioned second main body (421)'s second outer diameter could be identical at the upper part and the lower part. Namely, the aforementioned second main body (421) could be formed in the shape of a straight pipe. The aforementioned second inner diameter could be larger than the first outer diameter of the first main body (411).

The aforementioned second main body (421) could be located at the outer side of the first main body (411) in order for the central axis to be located in the same location as the central axis of the first main body (411). For example, the aforementioned second main body (421) could be combined with the first main body (411) in order to form a concentric circle with the first main body (411) with the horizontal cross-section as the reference point. The aforementioned second main body (421)'s inner circumference could form the second channel (420a) by being positioned to wrap the outer circumference of the first main body (411) overall. Namely, the aforementioned first main body (411) could be inserted into the inner side of the second main body (421). Additionally, the aforementioned second channel (420a) could be formed as space between the outer circumference of the first main body (411) and the inner circumference of the second main body (421). Therefore, the second inner diameter could be determined appropriately according to the amount of fuel or mixed gas sprayed and according to the outer diameter of the first main body (411). Namely, the aforementioned second inner diameter could be determined according to the horizontal cross-section and the first outer diameter of the second channel (420a). The aforementioned second channel (420a) provides a route through which the fuel or a mixed gas of fuel and an oxidizer sprayed from the second nozzle (420) flows. Additionally, the aforementioned second height could be determined according to the structure of the scrubber on which the reverse expansion burner (400) is installed. The aforementioned second height could be lower than the first height of the first main body (411). The aforementioned second main body (421) could be formed in such a way that the lower end forms a flat surface. Additionally, the aforementioned second main body (421) could be combined with the first main body (411) in such a way that the lower end is located at the same height as the lower end of the first main body (411). Therefore, the upper end of the aforementioned second main body (421) could be located lower than the upper end of the first main body (411). The second outer diameter of the aforementioned second main body (421) could be determined depending on the necessary strength and heat resistance, and could be formed with appropriate thickness. The aforementioned second main body (421) could be formed with an anticorrosive metallic material such as stainless steel. Since the aforementioned second main body (421) could come into contact with such components as F or Cl, it could be formed with an anticorrosive material.

The aforementioned second sealing ring (422) could include the second penetration hole (422a). The aforementioned second sealing ring (422) could be formed with a panel shape with the diameter that corresponds to the second inner diameter or second outer diameter of the second main body (421). The aforementioned second penetration hole (422a) could be formed with the diameter that corresponds to the first outer diameter of the first main body (411). The aforementioned second sealing ring (422) provides a route through which the first main body (411) is inserted as it seals the upper end of the second main body (421). The aforementioned first main body (411) is combined by being inserted into the inner side of the second main body (421) through the second penetration hole (422a).

The aforementioned second nozzle supply pipe (423) could be formed with a pipe with certain inner diameter. The aforementioned second nozzle supply pipe (423) could be connected to the second channel (420a) s one end combines with the upper part of the second main body (421). The aforementioned second nozzle supply pipe (423) could form a straight line or curve depending on the location where the reverse expansion burner (400) is formed. The aforementioned second nozzle supply pipe (423) supplies the fuel or mixed gas supplied from the outside to the second main body (421).

The aforementioned third nozzle (430) could include the third main body (431), the third sealing ring (432), and the third nozzle supply pipe (433). The aforementioned third nozzle could be located at the outer side of the second nozzle (420) of the reverse expansion burner (400). The aforementioned third nozzle (430) could form the third channel (430a) at the inner side through which either fuel or an oxidizer flows. The aforementioned third nozzle (430) could spray only fuel or a mixture of fuel and an oxidizer.

The aforementioned third main body (431) could be formed in the shape of a pipe with the upper part and the lower part opened. The aforementioned third main body (431) could have the third inner diameter, the third outer diameter, and the third height. The third main body (431) could have the same third inner diameter at the upper part and the lower part. Additionally, the aforementioned third main body (431) could have the same outer diameter at the upper part and the lower part. Namely, the aforementioned third main body (431) could be formed in the shape of a straight pipe. The aforementioned third inner diameter could be larger than the second outer diameter of the second main body (421). The aforementioned third main body (r431) could be located at the outer side of the second main body (421) in order for the central axis to be located in the same location as the central axis of the first main body (411). For example, the aforementioned second main body (421) could be inserted into the inner side of the third main body (431). Additionally, the aforementioned third main body (431) could be combined with the second main body (421) in order to form a concentric circle with the first main body (411) and the second main body (421).

The aforementioned third main body (431) could form the third channel (430a) by being located so that the inner circumference wraps the outer circumference of the second main body (421) overall. The aforementioned third channel (4320) could be formed with the space between the outer circumference of the second main body (421a) and the inner circumference of the third main body (431). Therefore, the aforementioned third inner diameter could be determined appropriately according to the amount of the fuel or mixed gas sprayed and according to the outer diameter of the second main body (421a). Namely, the aforementioned third inner diameter could be determined by the horizontal cross-sectional area of the third channel (430a) and the second outer diameter. The aforementioned third diameter (430a) provides a route through which the oxidizer or mixed gas of fuel and an oxidizer sprayed by the third nozzle (430).

Additionally, the aforementioned third height cold be determined appropriately according to the structure on which the reverse expansion burner (400) is installed. The aforementioned third height could be lower than the second height of the second main body (421). The aforementioned third main body (431) could be formed in such a way that the lower end forms a flat surface. Additionally, the aforementioned third main body (431) could be combined with the second main body (421) to have the same height as the lower end of the first main body (411) and the lower end of the second min body (421). The upper end of the aforementioned third main body (431) could be lower than the upper end of the second main body (421).

On the other hand, although not illustrated specifically, the aforementioned third main body (431) could be formed in such a way that the lower end is lower than the lower end of the first main body (411) and the lower end of the second main body (421). At this time, the aforementioned first main body (411) and the second main body (421) could be located at the same height. The aforementioned third main body (431) is the area where flames are formed by wrapping the outer side of the flames in order to intercept the inflow of waste gas. Therefore, the aforementioned reverse expansion burner (400) is able to prevent flames from being extinguished by inflowing waste gas. Additionally, extinguishment of flames could be prevented even in the event that substantial amount of nitrogen is contained in the waste gas supplied in the aforementioned semiconductor production process.

Additionally, even though the aforementioned reverse expansion burner (400) is not specifically illustrated, as the lower end height of the first main body (411), the lower end height of the second main body (421), and the lower end height of the third main body (431) are set differently, it is possible to increase combustion efficiency due to the mixing in advance of fuel and an oxidizer, or due to the reverse expansion of fuel.

With the aforementioned third main body (431), the third outer circumference is determined according to the necessary strength and heat resistance, and it could be formed with appropriate thickness. The aforementioned third main body (431) could be formed with an anticorrosive metallic material such as stainless steel. Since the aforementioned third main body (431) could come into contact with such components as F or C1, it could be formed with an anticorrosive material.

The aforementioned third sealing ring (432) could include the third penetration hole (432a). The aforementioned third sealing ring (432) could be formed in a panel shape with the diameter that correspond with the third inner diameter or third outer diameter of the third main body (431). The aforementioned third penetration hole (432a) could be formed with the diameter that corresponds to the second outer diameter of the second main body (421). The aforementioned third sealing ring (432) provides a route through which the second main body (421a) is inserted as the upper end of the third main body (431) is sealed. The aforementioned second main body (421) is combined with the third main body (431) by being inserted into its inner side through the third penetration hole (432a).

The aforementioned third nozzle supply pipe (433) could be formed in the shape of a pipe with certain inner diameter. The aforementioned third nozzle supply pipe (433) could be connected to the third channel (430a) by being combined with the upper part of the third main body (431). The aforementioned third nozzle supply pipe (433) could form a straight line or curve depending on the location where the reverse expansion burner (400) is formed. The aforementioned third nozzle supply pipe (433) supplies the fuel or mixed as supplied from the outside to the third main body (431).

The aforementioned first separation component (440) is in the shape of a block, rod, or panel, and could be formed in the length or width that corresponds to the distance between the first main body (411) and the second main body (421). The aforementioned first separation component (440) could be formed in the length that corresponds to the distance between the outer circumference of the first main body (411) and the outer circumference of the second main body (421). In such a case, the aforementioned first separation component (440)'s inner end could come into contact with the outer circumference of the first main body (411), and the outer end could be combined in such a way to be exposed to the outer circumference by penetrating the second main body (421). Additionally, the aforementioned second separation component (440) could be formed in the length that corresponds to the distance between the outer circumference of the first main body (411) and the inner circumference of the second main body (421). In such a case, the aforementioned first separation component (440) could come into contact with the outer circumference of the first main body (411), and the outer end could come into contact with the inner circumference of the second main body (421). The aforementioned first separation component (440) could be in the shape of a hole in which the inner end corresponds to the outer circumference or inner circumference of the first main body (411), and in the shape of a hole in which the outer end corresponds to the inner diameter or outer diameter of the second main body (421).

The aforementioned first separation component (440) could be formed with a porous material. For example, the aforementioned first separation component (440) could be formed with such materials as a perforated plate, beads, porous foams, a sintering plate, metal fibers, and packed beds.

More than one of the aforementioned first separation component (440) could be located separately along the height direction of the first main body (411). Additionally, at least two of the aforementioned first separation component (440) could be located separately along the circumference direction of the first main body (411). The aforementioned first separation component (440) supports the first main body (411) and the second main body (421) and maintains the separation distance of the first main body (411) and the second main body (421). More specifically, the aforementioned first separation component (440)'s inner side and outer side are combined with the first main body (411) and the second main body (421), respectively, so that the space between the outer circumference of the first main body (411) and the inner circumference of the second main body (421) is kept consistently.

The aforementioned second separation component (450) is in the shape of a block, rod, or panel, and could be formed in the length or width corresponding to the distance between the second main body (421) and the third main body (431). The aforementioned second separation component (450) could be formed in the length that corresponds to the distance between the outer circumference of the second main body (421) and the outer circumference of the third main body (431). In such a case, the aforementioned second separation component (450) could combine in such a way that the inner end comes into contact with the outer circumference of the second main body (421), and the outer end is exposed to the outer circumference by penetrating the third main body (431). Additionally, the aforementioned second separation component (450) could be formed in the length that corresponds to the distance between the outer circumference of the second main body (421) and the inner circumference of the third main body (431). In such a case, the aforementioned second separation component (450) could come into contact with the outer circumference of the second main body (421), and the outer end could come into contact with the inner circumference of the third main body (431). The aforementioned second separation component (450) could be in the shape of a hole that corresponds to the outer circumference or inner circumference of the second main body (421), and the outer end could be formed in the shape of a hole that corresponds to the inner circumference or outer circumference of the third main body (431).

The aforementioned second separation component (450) could be formed with a porous material. For example, the aforementioned second separation component (450) could be formed with a perforated plate, beads, porous foams, a sintering plate, metal fibers, and packed beds.

More than one of the aforementioned second separation component (450) could be positioned separately along the height direction of the second main body (421). Additionally, at least two of the aforementioned second separation component (450) could be located separately along the circumference direction of the second main body (421). The aforementioned second separation component (450) supports the second main body (421) and the third main body (421) and maintains the distance between the second main body (421) and the third main body (431). More specifically, the aforementioned second separation component (450)'s inner side and the outer side are combined with the second main body (421) and the third main body (431), respectively, so that the distance between the outer circumference of the second main body (421) and the inner circumference of the third main body (431) is kept consistent.

The aforementioned reverse expansion burner (400) could be combined in such a way that the first main body (411), the second main body (421), and the third main body (431) could be separated from each other. For example, the aforementioned second main body (421)'s second sealing ring (422) could be combined in such a way to be separated from the outer circumference of the first main body (411). Additionally, the third sealing ring (432) of the aforementioned third main body (431) could be combined in such a way to be able to be separated from the outer circumference of the second main body (421). Additionally, the aforementioned first separation component (440) and the second separation component (450) could be combined in such a way that the first main body (411) and the second main body (421) or the second main body and the third main body (431) could be separated from each other. Therefore, with the aforementioned reverse expansion burner (400), if a single main body is relatively severely corroded, it is possible lower the overall maintenance cost just by replacing the applicable main body.

Additionally, with the aforementioned reverse expansion burner (400), by adjusting the oxidizer sprayed by the first nozzle (410) and the third nozzle (430), it is possible to form partial oxidized flames with fuel rich combustion conditions. Therefore, the aforementioned reverse expansion burner (400) can increase $NF_3$ and $CF_4$ DRE (%) by using the hydrogen radicals produced by partially oxidized flames.

Additionally, the aforementioned reverse expansion burner (400) could increase DRE (%) of the PFCs gas by adjusting the temperature and strength of the flame by differentiating the types of oxidizers sprayed by the first nozzle (410) and the second nozzle (420) according to the type of the PFCs gas.

Additionally, it is possible to reduce the amount of carbon monoxide and nitrogen oxide produced during the combustion process by using mixed gas with reduced oxygen and nitrogen content sprayed from the first nozzle (410) or third nozzle (430).

Below, the scrubber burner in accordance with another embodiment of the present invention will be described.

Figure 13:
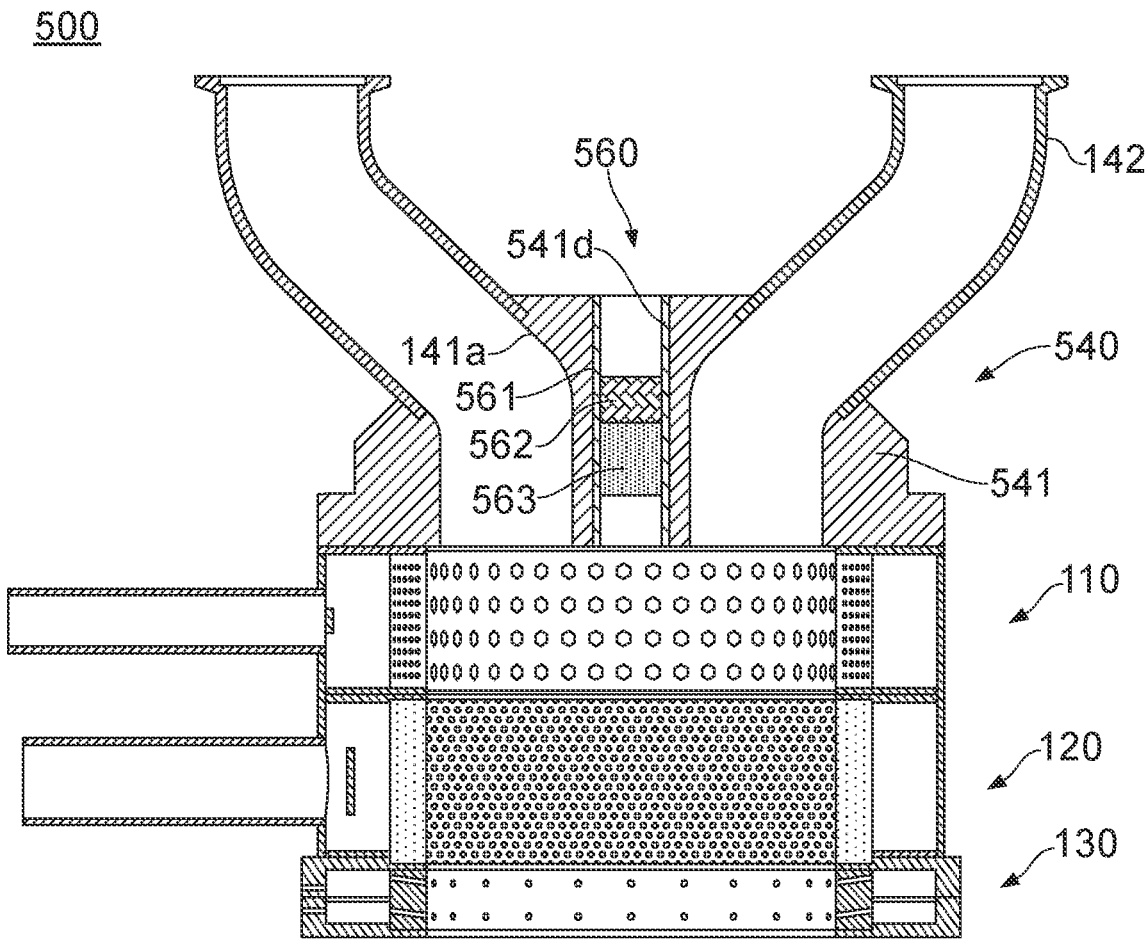
FIG. 13 is a vertical cross-sectional diagram of the scrubber burner in accordance with another embodiment of the present invention.

FIG. 13 is a vertical cross-sectional diagram of the scrubber burner in accordance with another embodiment of the present invention.

When we refer to FIG. 13, we can see that the scrubber burner (500) in accordance with another embodiment of the present invention could include a mixed burner module (110), a preheating burner module (120), an upper head module (540), and a super insulation burner (560). Additionally, the aforementioned scrubber burner (500) could further include a lower spray module (130).

In comparison with the scrubber burner (100) in accordance with FIG. 1 to FIG. 5, the aforementioned scrubber burner (500) could be additionally formed with a super insulation burner (560). Additionally, the aforementioned scrubber burner (500)'s upper head module (540)'s specific configuration is formed differently. On the other hand, the mixed burner module (110) and the preheating burner module (120) of the aforementioned scrubber burner (500) could be formed in the same way as or similar to the mixed burner module (110) or preheating burner module (120) of FIG. 1 to FIG. 5. Therefore, below the aforementioned scrubber burner (500) will be described with the focus on the upper head module (540) and the super insulation burner (560). Additionally, with the aforementioned scrubber burner (500), for the same or similar structures as those of the scrubber burner (100) of FIG. 1 to FIG. 5, the same numbers will be assigned, and specific descriptions could be omitted.

On the other hand, although the aforementioned scrubber burner (500) was not illustrated specifically, the main burner module (210) of FIG. 6 to FIG. 8 could be formed instead of the mixed burner module (110) and preheating burner module (120). Therefore, the aforementioned super insulation burner (560) could be applied in the same or similar structure to the scrubber burner (200) of FIG. 6 to FIG. 8, and to the scrubber burner (300) of FIG. 9 to FIG. 12.

The aforementioned upper head module (540) could include an upper head (541) and a waste gas inflow pipe (142). The aforementioned upper head module (540) could support the super insulation burner (560) that is exposed to the main combustion space (210*a*) by penetrating the upper head (541).

The aforementioned upper head (541) could include a waste gas inflow channel (141*a*) and a super insulation containing head channel (541*d*). The aforementioned upper head (541) supports the super insulation burner (560) that is combined with the super insulation head channel (541*d*).

The aforementioned super insulation containing head channel (541*d*) could be formed by penetrating from the outer side center to the lower side of the upper head (541). The aforementioned super insulation containing head channel (541*d*) provides a route that is combined as the super insulation burner (560) is penetrated. The aforementioned super insulation containing head channel (541*d*) could be formed with the inner diameter that corresponds to the outer diameter of the super insulation burner (560).

The aforementioned super insulation burner (560) could include a super insulation housing (561), a preheating layer (562), and a reforming layer (563). The aforementioned super insulation burner (560) is combined with the super insulation containing head channel (541*d*), and forms flames in the mixed combustion space (110*a*). The aforementioned super insulation burner (560) could preheat and reform mixed gas with fuel rich conditions to reform as hydrogen rich mixed gas to be sprayed. Here, the aforementioned fuel could be carbon hydrogen gas such as $CH_4$.

The aforementioned super insulation housing (561) could be formed in the shape of a tube, pipe, or barrel with the upper part and lower part opened. The aforementioned super insulation housing (561) could be formed in the shape of a cylinder. The aforementioned super insulation housing (561) could be formed with appropriate inner diameter according to the amount of mixed gas that flows in. The aforementioned super insulation housing (561) could be formed with an anticorrosive and heat conductive metallic material. The aforementioned gas housing could be formed with stainless steel or invar alloy, for example.

The aforementioned preheating layer (562) could be formed in the shape of a horizontal cross-section of the super insulation housing (561) and in the shape of a block with certain height. The aforementioned preheating layer (562) could be formed as circular block. The aforementioned preheating layer (562) could be formed with a porous material. The aforementioned preheating layer (562) could be formed with porous foams, beads, or honeycombs. The aforementioned porous foam could include multiple curved holes that penetrate from the upper side to the lower side. The aforementioned porous foam could be formed with a ceramic foam or metallic foam. Additionally, the aforementioned ceramic foam could be formed with alumina ($Al_2O_3$), zirconia ($ZrO_2$, PSZT), silicon carbide (SiC), or oxide bonded silicon carbide (OBSiC). The aforementioned honeycomb could include multiple straight holes that penetrate from the upper side to the lower side. The aforementioned bead could be formed with a ceramic foam. Therefore, the aforementioned bead could be formed with alumina ($Al_2O_3$), zirconia ($ZrO_2$, PSZT), silicon carbide (SiC), or oxide bonded silicon carbide (OBSiC). The aforementioned honeycomb could be formed with a ceramic material or metallic material. The aforementioned honeycomb could be formed with a ceramic material such as cordierite. Additionally, the aforementioned honeycomb could be formed with a metallic alloy such as Fe—Cr—Al.

The aforementioned preheating layer (562) could be located at the upper part inside the super insulation housing (561). The aforementioned preheating layer (562) could be located in such a way that the upper side is separated from the upper end to the lower end of the gas housing. Therefore, the aforementioned preheating layer (562) could be formed at the upper part with space into which fuel rich mixed gas flows. Additionally, the aforementioned preheating layer (562) could be heated by the heat that is transmitted from the reforming layer (563) that is located at the lower part. Therefore, the aforementioned preheating layer (562) could preheat fuel rich mixed gas flowing from the upper part to supply to the reforming layer (563).

The aforementioned reforming layer (563) could be formed in the shape of horizontal cross-section of the super insulation housing (561) and in the shape of a block with certain height. The aforementioned reforming layer (563) could be formed with the same horizontal area as the preheating layer (562). The aforementioned reforming layer (563) could be formed with appropriate height according to the amount of mixed gas that flows in. For example, if the aforementioned reforming layer (563)'s height is too low, it is possible that the reforming reaction will not proceed sufficiently. The aforementioned reforming layer (563) could be equipped with a passageway through which gas flows from the upper side to the lower side. The aforementioned reforming layer (563) could be formed in the structure of porous foam or honeycomb overall. The aforementioned reforming layer (563) could be formed with a ceramic material or metallic material. The aforementioned reforming layer (563) could be formed with alumina or alloys. The aforementioned reforming layer (563) is located at the lower part of the preheating layer inside the super insulation housing (561), and could be located so that the upper side will come into contact with the upper side of the preheating layer (562).

The aforementioned reforming layer (563) partially oxidizes preheated fuel rich mixed gas that flows in from the preheating layer (562) that is located at the upper part to convert to mixed gas with hydrogen conditions. The aforementioned reforming layer (563) converts fuel rich mixed gas to hydrogen rich mixed gas by the partial oxidation reaction. For example, the aforementioned reforming layer (563) could convert the mixed gas with the following reaction formula 1) to hydrogen rich conditions.

$$CH_4 + \tfrac{1}{2}O_2 \rightarrow CO + 2H_2 + Q \qquad 1)$$

The aforementioned reforming layer (563) could form flames by spraying hydrogen rich mixed gas downward. The flame that is formed by the aforementioned reforming layer (563) could decompose waste gas by reacting with waste gas in the mixed combustion space (110*a*) of the mixed burner module. For example, the aforementioned hydrogen rich mixed gas could decompose waste gas as indicated by the following reaction formulas 2) and 3). Reaction formula 2)

indicates the decomposition of $CF_4$ that is included in waste gas, and reaction formula 3) indicates a case in which $NF_3$ is included in waste gas.

$$CF_4+2H_2+Q \rightarrow 4HF+C \quad \quad 2)$$

$$2NF_3+3H_2+Q \rightarrow 4HF+N_2 \quad \quad 3)$$

Additionally, the aforementioned reforming layer (563) could transmit the heat produced by flames to the preheating layer (562) located at the upper part. The aforementioned preheating layer (562) could preheat fuel rich mixed gas that flows from the upper part as it is being heated.

The aforementioned preheating layer (562) and reforming layer (563) could increase heat efficiency by recycling heat. Namely, the aforementioned preheating layer (562) could preheat mixed gas with heat that is transmitted from the reforming layer (563). Especially, the aforementioned preheating layer (562) and reforming layer (563) are formed with porous materials, so that the contact area of the mixed gas is large, and as a result, efficient heat recycling is possible. Additionally, the aforementioned preheating layer (562) and reforming layer (463) can increase the extent of extension of heat and mixed gas by the eddying movement produced as mixed gas flows inside the porous material. Additionally, it is possible for the aforementioned preheating layer (562) and reforming layer (563) to form super insulation flames with temperature that is higher than the insulation flame temperature due to high heat recycling.

The aforementioned super insulation burner (560) could expand the combustion limit by increasing the amount of heat produced more than the amount of heat lost. The aforementioned super insulation burner (560) can combust even under ultra-low fuel conditions and ultra-high fuel conditions. Namely, the aforementioned super insulation burner (560) could be applied to highly efficient low-pollution burners through mixed combustion under ultra-low fuel conditions. Additionally, it is possible for the aforementioned super insulation burner (560) to reform fuel by producing hydrogen and carbon monoxide through partial oxidation under ultra-high fuel conditions.

The aforementioned description is a single embodiment to embody the scrubber burner in accordance with the present invention, and the aforementioned invention is not limited to the aforementioned embodiment. As claimed in the claims section below, the technological spirit of the present invention encompasses the scope in which any person with ordinary level of knowledge in the field in which the present invention belongs can carry out various modifications without deviating from the gist of the present invention.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A scrubber burner comprising:
   a mixed burner module comprising:
   a mixed spray ring on which multiple spray holes penetrate from an outer circumference of the mixed spray ring to an inner circumference of the mixed spray ring and that sprays mixed fuel gas in a mixed combustion space formed within the inner circumference of the mixed spray ring;
   a mixed guide ring positioned radially outward from the mixed spray ring and separated from the outer circumference of the mixed spray ring, the mixed guide ring equipped with multiple guide holes that penetrate from an outer circumference of the mixed guide ring to an inner circumference of the guide ring; and
   a mixed housing that is separated from the outer circumference of the mixed guide ring to form a mixed gas channel between the mixed housing and the mixed guide ring through which the mixed fuel gas flows;
   a preheat burner module located directly above or directly below the mixed burner module, the preheat burner module comprising:
   a preheating spray ring that is formed with a porous material comprising one of metal fibers, metal foams, packed beads, ceramic foams, nano-sized porous media and porous sintered metals and that preheats a fuel gas before providing the fuel gas to a preheating combustion space formed inside the preheating spray ring;
   a preheating guide ring around the outer circumference of the preheating spray ring and equipped with multiple preheating guide holes that penetrate from an outer circumference of the preheating guide ring to an inner circumference of the guide ring; and
   a preheating housing that forms a ring shaped gas channel that is separated from the outer circumference of the preheating guide ring and through which the fuel gas flows
   wherein the mixed combustion space is connected to the preheating combustion space; and
   a lower spray module that is located directly below the preheating burner module or directly below the mixed burner module, the lower spray module comprising:
   a lower spray ring comprising a lower spray hole that sprays lower fuel gas into a lower combustion space that is connected with the preheating combustion space or the mixed combustion space;
   a lower housing that wraps the outer circumference of the lower spray ring to form a lower gas channel in the shape of a ring through which the lower fuel gas flows and that is equipped with a lower outer wall hole that penetrates from the outer circumference to the lower gas channel, and wherein the lower spray hole sprays lower fuel gas from the lower gas channel.

2. The scrubber burner according to claim 1, wherein the inner circumference of the preheating guide ring contacts the outer circumference of the preheating spray ring.

3. The scrubber burner according to claim 1, wherein there are at least two preheating burner modules that are layered and wherein the aforementioned preheating burner modules spray different components or fuel gases with different mix ratios.

4. The scrubber burner according to claim 1, wherein there are at least two mixed burner modules that are layered.

5. The scrubber burner according to claim 1, wherein the lower spray module further comprises a lower separation panel that separates the lower gas channel into a first lower gas channel and a second lower gas channel, and wherein the lower outer wall hole and the lower spray hole are connected to the first lower gas channel and the second lower gas channel, respectively.

6. The scrubber burner of claim 1 that further includes an insulation burner that preheats fuel rich mixed gas and reforms it to hydrogen rich mixed gas to spray to the aforementioned preheating combustion space.

7. The scrubber burner according to claim 6, wherein the insulation burner includes an insulation housing formed in the shape of a tube that is opened at an upper part and a lower part, a preheating layer that is located at an upper side inside the insulation housing and that preheats the fuel rich mixed gas, and a reforming layer that is formed with a porous material, and that is located at a lower part of the preheating layer to reform the fuel rich mixed gas into the hydrogen rich mixed gas.

* * * * *